United States Patent
Parameswaran et al.

(10) Patent No.: US 11,620,574 B2
(45) Date of Patent: Apr. 4, 2023

(54) HOLISTIC OPTIMIZATION FOR ACCELERATING ITERATIVE MACHINE LEARNING

(71) Applicant: The Board of Trustees of the University of Illinois, Urbana, IL (US)

(72) Inventors: Aditya G Parameswaran, Urbana, IL (US); Stephen Macke, Urbana, IL (US); Doris Suiyi Xin, Urbana, IL (US)

(73) Assignee: THE BOARD OF TRUSTEES OF THE UNIVERSITY OF ILLNOIS, Urbana, IL (US)

( * ) Notice: Subject to any disclaimer, the term of this patent is extended or adjusted under 35 U.S.C. 154(b) by 598 days.

(21) Appl. No.: 16/702,804

(22) Filed: Dec. 4, 2019

(65) Prior Publication Data
US 2020/0184376 A1    Jun. 11, 2020

Related U.S. Application Data

(60) Provisional application No. 62/775,511, filed on Dec. 5, 2018.

(51) Int. Cl.
*G06N 20/00* (2019.01)
*G06F 9/38* (2018.01)
*G06F 11/34* (2006.01)

(52) U.S. Cl.
CPC ........... *G06N 20/00* (2019.01); *G06F 9/3838* (2013.01); *G06F 11/3466* (2013.01)

(58) Field of Classification Search
CPC .... G06N 20/00; G06F 9/3838; G06F 11/3466
See application file for complete search history.

(56) References Cited

U.S. PATENT DOCUMENTS

2016/0358101 A1* 12/2016 Bowers ................. G06N 20/00

OTHER PUBLICATIONS

MA. Sujeeth, H. Lee, K. Brown, T. Rompf, H. Chafi, M. Wu, A. Atreya, M. Odersky, and K. Olukotun. Optiml: an implicitly parallel domain-specific language for machine learning. In Proceedings of the 28th International Conference on Machine Learning (ICML-11), pp. 609-616, 2011.
R. Sumbaly, J. Kreps, and S. Shah. The big data ecosystem at linkedin. In Proceedings of the 2013 ACM SIGMOD International Conference on Management of Data, pp. 1125-1134. ACM, 2013.
(Continued)

*Primary Examiner* — Wissam Rashid
(74) *Attorney, Agent, or Firm* — McDonnell Boehnen Hulbert & Berghoff LLP

(57) ABSTRACT

A great deal of time and computational resources may be used when developing a machine learning or other data processing workflow. This can be related to the need to re-compute the workflow in response to adjustments to the workflow parameters, in order to assess the benefit of such adjustments so as to develop a workflow that satisfies accuracy or other constraints. Embodiments herein provide time and computational savings by selectively storing and re-loading intermediate results of steps of a data processing workflow. For each step of the workflow, during execution, a decision is made whether to store the intermediate results of the step. Thus, these embodiments can offer storage savings as well as processing speedups when repeatedly re-executing machine learning or other data processing workflows during workflow development.

20 Claims, 12 Drawing Sheets

(56) References Cited

OTHER PUBLICATIONS

M. Abadi, A. Agarwal, P. Barham, E. Brevdo, Z. Chen, C. Citro, G. S. Corrado, A. Davis, J. Dean, M. Devin, et al. Tensorflow: Large-scale machine learning on heterogeneous distributed systems. arXiv preprint arXiv:1603.04467, 2016.

M. R. Anderson, D. Antenucci, V. Bittorf, M. Burgess, M. J. Cafarella, A. Kumar, F. Niu, Y. Park, C. Ré, and C. Zhang. Brainwash: A data system for feature engineering. In CIDR, 2013.

M. R. Anderson and M. Cafarella. Input selection for fast feature engineering. In Data Engineering (ICDE), 2016 IEEE 32nd International Conference on, pp. 577-588. IEEE, 2016.

M. Armbrust, R. S. Xin, C. Lian, Y. Huai, D. Liu, J. K. Bradley, X. Meng, T. Kaftan, M. J. Franklin, A. Ghodsi, et al. Spark sql: Relational data processing in spark. In Proceedings of the 2015 ACM SIGMOD International Conference on Management of Data, pp. 1383-1394. ACM, 2015.

D. Baylor, E. Breck, H.-T. Cheng, N. Fiedel, C. Y. Foo, Z. Haque, S. Haykal, M. Ispir, V. Jain, L. Koc, et al. Tfx: A tensorflow-based production-scale machine learning platform. In Proceedings of the 23rd ACM SIGKDD International Conference on Knowledge Discovery and Data Mining, pp. 1387-1395. ACM, 2017.

M. Boehm, A. V. Evfimievski, N. Pansare, and B. Reinwald. Declarative machine learning-a classification of basic properties and types. arXiv preprint arXiv:1605.05826, 2016.

S. P. Callahan, J. Freire, E. Santos, C. E. Scheidegger, C. T. Silva, and H. T. Vo. Vistrails: visualization meets data management. In Proceedings of the 2006 ACM SIGMOD international conference on Management of data, pp. 745-747. ACM, 2006.

L. Chen, A. Kumar, J. Naughton, and J. M. Patel. Towards linear algebra over normalized data. PVLDB, 10(11):1214-1225, 2017.

R. Chirkova, J. Yang, et al. Materialized views. Foundations and Trends® in Databases, 4(4):295-405, 2012.

A. Crotty, A. Galakatos, K. Dursun, T. Kraska, C. Binnig, U. Cetintemel, and S. Zdonik. An architecture for compiling udf-centric workflows. PVLDB, 8(12): 1466-1477, 2015.

C. De Sa, A. Ratner, C. Ré, J. Shin, F. Wang, S. Wu, and C. Zhang. Deepdive: Declarative knowledge base construction. SIGMOD Rec., 45(1):60-67, Jun. 2016.

E. Deelman, J. Blythe, Y. Gil, C. Kesselman, G. Mehta, S. Patil, M.-H. Su, K. Vahi, and M. Livny. Pegasus: Mapping scientific workflows onto the grid. In Grid Computing, pp. 11-20. Springer, 2004.

I. Elghandour and A. Aboulnaga. Restore: reusing results of mapreduce jobs. PVLDB, 5(6):586-597, 2012.

A. Ghoting, R. Krishnamurthy, E. Pednault, B. Reinwald, V. Sindhwani, S. Tatikonda, Y. Tian, and S. Vaithyanathan. Systemml: Declarative machine learning on mapreduce. In 2011 IEEE 27th International Conference on Data Engineering, pp. 231-242. IEEE, 2011.

A. D. Gordon. A tutorial on co-induction and functional programming. In Functional Programming, Glasgow 1994, pp. 78-95. Springer, 1995.

P. K. Gunda, L. Ravindranath, C. A. Thekkath, Y. Yu, and L. Zhuang. Nectar: Automatic management of data and computation in datacenters. In OSDI, vol. 10, pp. 1-8, 2010.

M. Hall, E. Frank, G. Holmes, B. Pfahringer, P. Reutemann, and I. H. Witten. The WEKA data mining software: an update. ACM SIGKDD explorations newsletter, 11(1):10-18, 2009.

A. Jindal, K. Karanasos, S. Rao, and H. Patel. Selecting subexpressions to materialize at datacenter scale. PVLDB, 11 (7):800-812, 2018.

A. Karpathy and L. Fei-Fei. Deep visual-semantic alignments for generating image descriptions. In Proceedings of the IEEE Conference on Computer Vision and Pattern Recognition, pp. 3128-3137, 2015.

R. Kohavi. Scaling up the accuracy of naive-bayes classifiers: a decision-tree hybrid. In Proceedings of the Second International Conference on Knowledge Discovery and Data Mining, pp. 202-207. AAAI Press, 1996.

S. Krishnan, J. Wang, E. Wu, M. J. Franklin, and K. Goldberg. Activeclean: Interactive data cleaning while learning convex loss models. arXiv preprint arXiv:1601.03797, 2016.

A. Kumar, J. Naughton, and J. M. Patel. Learning generalized linear models over normalized data. In Proceedings of the 2015 ACM SIGMOD International Conference on Management of Data, pp. 1969-1984. ACM, 2015.

A. Kumar, J. Naughton, J. M. Patel, and X. Zhu. To join or not to join?: Thinking twice about joins before feature selection. In Proceedings of the 2016 International Conference on Management of Data, pp. 19-34. ACM, 2016.

Y. LeCun, L. Bottou, Y. Bengio, and P. Haffner. Gradient-based learning applied to document recognition. Proceedings of the IEEE, 86(11):2278-2324, 1998.

Y. Low, D. Bickson, J. Gonzalez, C. Guestrin, A. Kyrola, and J. M. Hellerstein. Distributed GraphLab: A framework for machine learning and data mining in the cloud. PVLDB, 5(8):716-727, 2012.458.

B. Ludäscher, I. Altintas, C. Berkley, D. Higgins, E. Jaeger, M. Jones, E. A. Lee, J. Tao, and Y. Zhao. Scientific workflow management and the kepler system. Concurrency and Computation: Practice and Experience, 18(10):1039-1065, 2006.

C. D. Manning, M. Surdeanu, J. Bauer, J. R. Finkel, S. Bethard, and D. McClosky. The Stanford CoreNLP Natural Language Processing Toolkit. In ACL (System Demonstrations), pp. 55-60, 2014.

E. Meijer, B. Beckman, and G. Bierman. Linq: Reconciling object, relations and XML in the .net framework. In Proceedings of the 2006 ACM SIGMOD International Conference on Management of Data, SIGMOD '06, pp. 706-706, New York, NY, USA, 2006. ACM.

X. Meng, J. Bradley, E. Sparks, S. Venkataraman, D. Liu, J. Freeman, D. Tsai, M. Amde, S. Owen, et al. Mllib: Machine learning in apache spark. 2016.

T. Mikolov, I. Sutskever, K. Chen, G. S. Corrado, and J. Dean. Distributed representations of words and phrases and their compositionality. In Advances in neural information processing systems, pp. 3111-3119, 2013.

M. A. Munson. A study on the importance of and time spent on different modeling steps. ACM SIGKDD Explorations Newsletter, 13(2):65-71, 2012.

C. Olston, B. Reed, U. Srivastava, R. Kumar, and A. Tomkins. Pig latin: a not-so-foreign language for data processing. In Proceedings of the 2008 ACM SIGMOD international conference on Management of data, pp. 1099-1110. ACM, 2008.

D. Olteanu and M. Schleich. F: regression models over factorized views. PVLDB, 9(13):1573-1576, 2016.

S. Owen, R. Anil, T. Dunning, and E. Friedman. Mahout in action. 2012.

S. Palkar, J. J. Thomas, A. Shanbhag, D. Narayanan, H. Pirk, M. Schwarzkopf, S. Amarasinghe, M. Zaharia, and S. InfoLab. Weld: A common runtime for high performance data analytics. In Conference on Innovative Data Systems Research (CIDR), 2017.

A. Paszke, S. Gross, S. Chintala, and G. Chanan. Pytorch: Tensors and dynamic neural networks in python with strong gpu acceleration, 2017.

K. Patel, N. Bancroft, S. M. Drucker, J. Fogarty, A. J. Ko, and J. Landay. Gestalt: integrated support for implementation and analysis in machine learning. In Proceedings of the 23nd annual ACM symposium on User interface software and technology, pp. 37-46. ACM, 2010.

F. Pedregosa, G. Varoquaux, A. Gramfort, V. Michel, B. Thirion, O. Grisel, M. Blondel, P. Prettenhofer, R. Weiss, V. Dubourg, et al. Scikit-learn: Machine learning in python. Journal of Machine Learning Research, 12(Oct):2825-2830, 2011.

A. M. Pitts. Operationally-based theories of program equivalence. Semantics and Logics of Computation, 14:241, 1997.

W. Rasband. Imagej: Image processing and analysis in java. Astrophysics Source Code Library, 2012.

A. Ratner, S. H. Bach, H. Ehrenberg, J. Fries, S. Wu, and C. Ré. Snorkel: Rapid training data creation with weak supervision. arXiv preprint arXiv:1711.10160, 2017.

B. Recht, C. Re, S. Wright, and F. Niu. Hogwild: A lock-free approach to parallelizing stochastic gradient descent. In Advances in neural information processing systems, pp. 693-701, 2011.

(56) References Cited

OTHER PUBLICATIONS

X. Ren, J. Shen, M. Qu, X. Wang, Z. Wu, Q. Zhu, M. Jiang, F. Tao, S. Sinha, D. Liem, et al. Life-inet: A structured network-based knowledge exploration and analytics system for life sciences. Proceedings of ACL 2017, System Demonstrations, pp. 55-60, 2017.
H. G. Rice. Classes of recursively enumerable sets and their decision problems. Transactions of the American Mathematical Society, 74(2):358-366, 1953.
E. R. Sparks, S. Venkataraman, T. Kaftan, M. J. Franklin, and B. Recht. Keystoneml: Optimizing pipelines for large-scale advanced analytics. In Data Engineering (ICDE), 2017 IEEE 33rd International Conference on, pp. 535-546. IEEE, 2017.
M. Stonebraker, P. Brown, A. Poliakov, and S. Raman. The architecture of scidb. In International Conference on Scientific and Statistical Database Management, pp. 1-16. Springer, 2011.
J. Tang, M. Qu, M. Wang, M. Zhang, J. Yan, and Q. Mei. Line: Large-scale information network embedding. In Proceedings of the 24th International Conference on World Wide Web, pp. 1067-1077. International World Wide Web Conferences Steering Committee, 2015.
M. Zinkevich, M. Weimer, L. Li, and A. J. Smola. Parallelized stochastic gradient descent. In Advances in neural information processing systems, pp. 2595-2603, 2010.
M. Vartak, J. M. da Trindade, S. Madden, and M. Zaharia. Mistique: A system to store and query model intermediates for model diagnosis. In Proceedings of the 2018 ACM International Conference on Management of Data, 2018.
M. Vartak, P. Ortiz, K. Siegel, H. Subramanyam, S. Madden, and M. Zaharia. Supporting fast iteration in model building. In NIPS Workshop LearningSys, 2015.
M. Weimer, T. Condie, R. Ramakrishnan, et al. Machine learning in scalops, a higher order cloud computing language. In NIPS 2011 Workshop on parallel and large-scale machine learning (BigLearn), vol. 9, pp. 389-396, 2011.
M. Weiser. Program slicing. In Proceedings of the 5th international conference on Software engineering, pp. 439-149. IEEE Press, 1981.
J. Woodcock, P. G. Larsen, J. Bicarregui, and J. Fitzgerald. Formal methods: Practice and experience. ACM computing surveys (CSUR), 41(4):19, 2009.
D. Xin, L. Ma, J. Liu, S. Macke, S. Song, and A. Parameswaran. Accelerating human-in-the-loop machine learning Challenges and opportunities (vision paper). In Proceedings of the Second Workshop on Data Management for End-to-End Machine Learning, DEEM'18. ACM, 2018.
D. Xin, L. Ma, J. Liu, S. Macke, S. Song, and A. Parameswaran. Helix: Accelerating human-in-the-loop machine learning (demo paper). PVLDB, 11(12):1958-1961, 2018.
D. Xin, L. Ma, S. Song, and A. Parameswaran. How developers iterate on machine learning workflows—a survey of the applied machine learning literature. KDD IDEA Workshop, 2018.
D. Xin, S. Macke, L. Ma, R. Ma, S. Song, and A. Parameswaran. Helix: Holistic optimization for accelerating iterative machine learning. arXiv preprint arXiv:1812.05762, 2018.
J. Yu and R. Buyya. A taxonomy of workflow management systems for grid computing. Journal of Grid Computing, 3(3-4):171-200, 2005.
Y. Yu, M. Isard, D. Fetterly, M. Budiu, Ú. Erlingsson, P. K. Gunda, and J. Currey. Dryadlinq: A system for general-purpose distributed data-parallel computing using a high-level language. In OSDI, vol. 8, pp. 1-14, 2008.
M. Zaharia. Introducing mlflow: an open source machine learning platform, 2018 (accessed Oct. 8, 2018). https://databricks.com/blog/2018/06/05/introducing-mlflowan-open-source-machine-learning-platform.html.
M. Zaharia, M. Chowdhury, T. Das, A. Dave, J. Ma, M. McCauley, M. J. Franklin, S. Shenker, and I. Stoica. Resilient distributed datasets: A fault-tolerant abstraction for in-memory cluster computing. In Proceedings of the 9th USENIX conference on Networked Systems Design and Implementation. USENIX Association, 2012.
C. Zhang. DeepDive: A data management system for automatic knowledge base construction. PhD thesis, Citeseer, 2015.
C. Zhang, A. Kumar, and C. Ré. Materialization optimizations for feature selection workloads. ACM Transactions on Database Systems (TODS), 41(1):2, 2016.

\* cited by examiner

US 11,620,574 B2

HOLISTIC OPTIMIZATION FOR ACCELERATING ITERATIVE MACHINE LEARNING

CROSS-REFERENCE TO RELATED APPLICATION

This application claims priority to U.S. Provisional Patent Application No. 62/775,511, filed Dec. 5, 2018, which is incorporated herein by reference in its entirety.

BACKGROUND

Machine learning workflows, complex data processing tasks, and a variety of processes include experimentally setting a great many parameters. In order to determine satisfactory settings for all of the parameters of such a process, it may be necessary to re-execute the process a plurality of times, following changes made to the parameters by a human user. This can be computationally expensive. Additionally, it can require a large amount of time from the human user, as the process re-executes in response to their changing the process parameters. These delays between the human user adjusting the parameters and seeing the results of those adjustments can also make it difficult for the user to develop an intuition for the effects of those adjustments.

SUMMARY

One aspect of the present disclosure provides an article of manufacture including a non-transitory computer-readable medium, having stored thereon program instructions that, upon execution by a computing device, cause the computing device to perform operations. The operations include: (i) obtaining a representation of a machine learning workflow, wherein the machine learning workflow includes a plurality of data processing tasks, and wherein directed data dependencies exist between pairs of the data processing tasks and between portions of target data and instances of the data processing tasks; (ii) executing the machine learning workflow, wherein executing the machine learning workflow comprises, for a particular data processing task of the plurality of data processing tasks, storing an output of the particular data processing task to a data storage; (iii) receiving an indication of a modification to the machine learning workflow; (iv) based on the machine learning workflow and the indication, generating a modified machine learning workflow; and (v) executing the modified machine learning workflow. Executing the modified machine learning workflow includes: (a) loading the output of the particular data processing task, and (b) using the output to determine an output of a different data processing task of the plurality of data processing tasks.

Another aspect of the present disclosure provides a method including: (i) obtaining a representation of a machine learning workflow, wherein the machine learning workflow includes a plurality of data processing tasks, and wherein directed data dependencies exist between pairs of the data processing tasks and between portions of target data and instances of the data processing tasks; (ii) executing the machine learning workflow, wherein executing the machine learning workflow comprises, for a particular data processing task of the plurality of data processing tasks, storing an output of the particular data processing task to a data storage; (iii) receiving an indication of a modification to the machine learning workflow; (iv) based on the machine learning workflow and the indication, generating a modified machine learning workflow; and (v) executing the modified machine learning workflow. Executing the modified machine learning workflow includes: (a) loading the output of the particular data processing task, and (b) using the output to determine an output of a different data processing task of the plurality of data processing tasks.

Yet another aspect of the present disclosure provides a method including: (i) obtaining a representation of a data processing workflow, wherein the data processing workflow includes a plurality of data processing tasks, and wherein directed data dependencies exist between pairs of the data processing tasks and between portions of target data and instances of the data processing tasks; (ii) executing the data processing workflow, wherein executing the data processing workflow comprises, for a particular data processing task of the plurality of data processing tasks, storing an output of the particular data processing task to a data storage; (iii) receiving an indication of a modification to the data processing workflow; (iv) based on the data processing workflow and the indication, generating a modified data processing workflow; and (v) executing the modified data processing workflow. Executing the modified data processing workflow includes: (a) loading the output of the particular data processing task, and (b) using the output to determine an output of a different data processing task of the plurality of data processing tasks.

These as well as other aspects, advantages, and alternatives, will become apparent to those of ordinary skill in the art by reading the following detailed description, with reference where appropriate to the accompanying drawings.

DETAILED DESCRIPTION

Figure 1C:
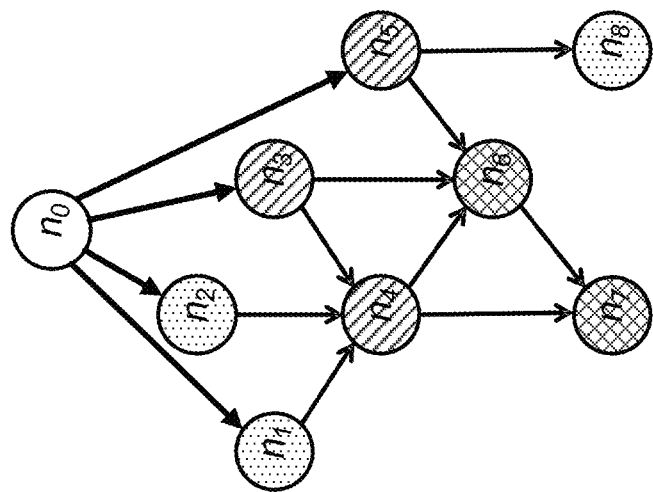
FIG. 1C illustrates the data processing tasks of FIG. 1A, indicating the status of each task during re-execution of the workflow.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

A variety of different applications include the development of complicated, multi-task or multi-step analyses, or "workflows," that can include myriad configuration settings, including specification of the identity, number, and interdependence of such tasks within the overall analysis, in order to completely specify the analysis. For example, the performance of a complex data processing task to generate a recommendation or other output (e.g., as part of an academic or governmental investigation) could include specifying which sub-tasks are part of the overall data processing workflow as well as specifying the data dependencies between such tasks and specifying the particular configurations of each of the tasks. The output of such a data processing workflow, once fully specified and executed, could be used to inform a decision or could be published to communicate a scientific result. In another example, the generation of a machine learning model for application to data in a production environment could include specifying which sub-tasks (e.g., data preprocessing, artificial neural networks or other machine learning tasks) are part of the overall machine learning workflow as well as specifying the data dependencies between such tasks and specifying the particular configurations of each of the tasks. The machine learning model or other machine learning algorithm generated by such a machine learning workflow, once fully specified and executed, could be applied to generate outputs (predictions, classifier values, filtered images, artificially generated images, command outputs for a robot or other system) from novel inputs.

A variety of different tasks could be part of such a machine learning workflow or other data processing workflow. Some of the tasks could be directed to data extraction and preprocessing, e.g., identifying and/or extracting specified data from a larger database of input data, cleaning input data (e.g., to remove noise, outliers, etc.), normalizing input data (e.g., removing a mean or bias from the data, scaling the data to conform to a standard distribution or range), binning input data, or performing some other data preprocessing task. Such data preprocessing tasks could be applied to information in a set of input data, or to outputs of other tasks within a workflow (e.g., to a continuous output of a machine learning task).

Some of the data processing tasks could be tasks to simplify or otherwise represent input data (e.g., from another task, or from a set of input data). Such tasks could include generating a distribution, mode, mean, frequency spectrum, or other representative parameter(s) from the input data. Such tasks could include projecting multi-dimensional input data into a lower-dimensional output representation or otherwise performing a dimensionality reduction on input data. This can include relatively straightforward methods, like principal components analysis, independent components analysis, or other methods. Additionally or alternatively, other methods, including methods that can be considered to fall within the set of "machine learning" methods could be applied, e.g., isomap, support vector machines, self-organizing maps, or other methods.

Some of the data processing tasks within a workflow could be machine learning tasks, e.g., tasks to apply and/or train an artificial neural network, a self-organizing map, a perceptron, a support vector machine, a Bayesian network, a decision and/or regression tree, a genetic algorithm, or some other machine learning algorithm. Such a machine learning task could be applied to simplify an input for further processing, or to generate an output that may be applied to some other task (e.g., classifying an input image according to its contents). The machine learning task could be supervised (e.g., to train an encoder to predict a set of known "true" outputs from a set of corresponding inputs), unsupervised (e.g., to detect latent classes or other information present in a set of inputs without any known corresponding outputs), or a hybrid of the two. The machine learning tasks include multiple layers, e.g., one or more input convolutional layers of a convolutional neural network that feeds one or more outputs layers to generate a classification of an image input to the input layers. In some examples, different layers of an overall machine learning task (e.g., the input convolutional layers and the output classifier layers) could be segregated into respective different tasks of a workflow. This could be done, e.g., to allow the output of a common machine learning task to be shared by multiple downstream tasks, such that the cost of training the upstream tasks is also shared.

Such workflows, whether they implement a machine learning workflow or some other variety of data processing workflow, may include a large number of configuration parameters in order to fully specify the workflow. Such parameters include the identity, type, and interdependencies between the tasks that are part of the workflow, as well as a specification of the properties and source of the data used as input to the workflow. The parameters also include any parameters used to specify the individual tasks within the workflow. For example, where the task is a data preprocessing task to bin an input variable, the data preprocessing task may be specified by one or more parameters describing the number of bins used to bin the input data, parameters of a model used to determine the bin boundaries, a parameter setting whether the bins are to be uniform or variable-width, or some other parameters.

In another example, where the task is a machine learning task to train and execute a machine learning model (e.g., a support vector machine, an artificial neural network), the machine learning task may be specified by one or more parameters describing the number of layers of units in the model, the type of units in each layer (e.g., an output function of units in the layer), a degree of interconnectedness of the units in each layer and between layers, parameters of a function used to initially set the model weights, a step size or other parameters describing the method used to train the network using input data, a percent of the available data to use for training versus validation of the model, an accuracy threshold, a maximum number of iterations, or some other parameter used to determine whether to terminate training of a machine learning model, or some other parameter or hyperparameter that is used to define the properties and structure of a machine learning model, of the data used to train the model, of the process used to train and/or validate the model, or some other property of construction, training, and/or application of the machine learning model.

Even a relatively simple workflow, containing relatively few tasks, may have a great many such parameters to set. These settings may be adjusted manually by one or more human users in order to ensure that the workflow performs a desired task satisfactorily or such that the workflow satisfies some other constraint. The human user may analyze the result of execution of the workflow in a particular configuration and, in response, adjust one or more parameters defining the workflow. Thus modified workflow can then be re-executed, and differences between the performance of the workflow before and after the modification(s) may be analyzed by the human in order to determine additional modifications to the workflow, or to determine that the workflow is acceptable.

For example, a human may iteratively adjust a data processing workflow until the results of the analysis represented by the workflow have a sufficient accuracy at predicting an output variable of interest, until a power of prediction of a model represented by the workflow reaches a satisfactory value, or until some other consideration is satisfied. In another example, a human may iteratively adjust a machine learning workflow until a model represented by the workflow can recapitulate relationships between inputs and outputs in a target dataset to a desired degree of precision and/or accuracy, until the model generates classifications of input data that are satisfactory to the human user, or until some other consideration is satisfied.

Under such an iterative process, some or all of the machine learning or other data processing workflow must be re-computed following a modification of the workflow's configuration, in order to assess the effect of the modification. For large workflows, this can be computationally expensive, especially if many iterative modifications of the workflow are required to develop a satisfactory workflow. Additionally, this re-computation may introduce significant latency and delay between a user selecting and/or inputting a modification to a workflow and receiving a report of the effects of that modification. This can result in increased human user time spent waiting for the results of their modifications to be available, which can be expensive. This delay may also reduce the quality of the resultant workflow, as the human user's concentration may be repeatedly interrupted, and the latency between making a modification and observing its effect may make it more difficult to assess the overall impact of the modification.

Embodiments described herein can address these and other issues by selectively storing intermediate results of data processing tasks of a machine learning or other variety of data processing workflow. These intermediate results, determined during execution of the workflow according to a first configuration, can then be re-used to speed up execution of the workflow when modified to a second configuration. Accordingly, the computational and time cost of re-computing the information processing task(s) whose intermediate output(s) was stored, as well as potentially other tasks on which that task depended, may be avoided in favor of the relatively lower cost of loading the stored output(s).

Figure 1B:
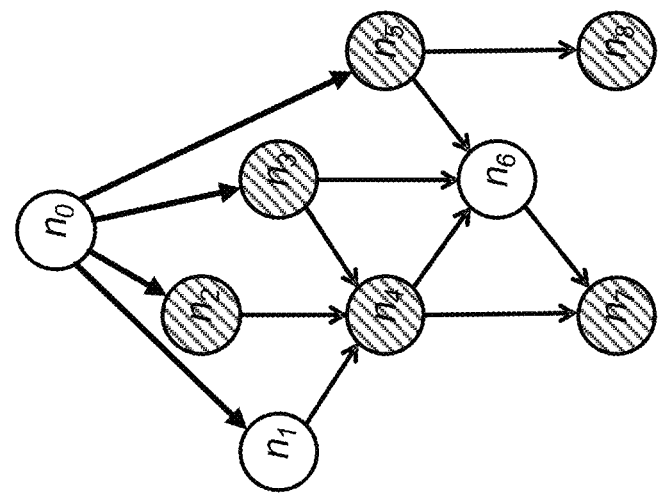
FIG. 1B illustrates the data processing tasks of FIG. 1A, indicating which tasks have stored outputs.
Figure 1A:
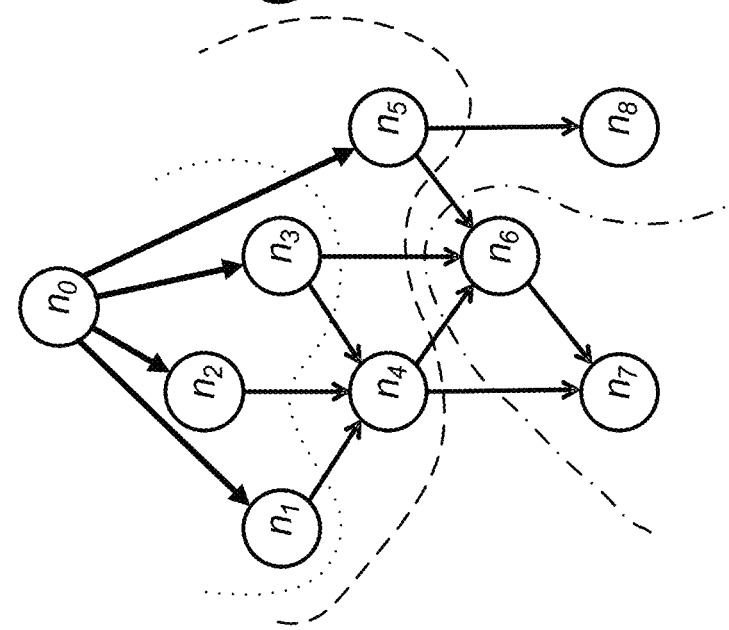
FIG. 1A illustrates data processing tasks of an example machine learning or other data processing workflow.

To illustrate these embodiments, FIG. 1A shows information processing steps ($n_{1-8}$) of an example workflow. The workflow receives input data $n_0$, portions of which are used as inputs for information processing tasks $n_1$, $n_2$, $n_3$, and $n_5$ of the workflow. Dependencies within the workflow are illustrated by arrows, which indicate that at least a portion of a first information processing task is used as an input by a second information processing task. An information processing task can provide output(s) to more than one other information processing task, and can receive, as input, outputs from more than one other information processing task. The workflow can be represented (as it is in FIG. 1A) as a directed acyclic graph (DAG).

A representation of the workflow can include representations of the identities of each of the information processing tasks, along with representations of the information dependencies between the tasks and representations of the configuration of the tasks themselves (e.g., representations of parameters defining the configuration of the individual information processing tasks).

When a particular information processing task is modified (e.g., when a configuration setting of the task is modified, or when the information dependencies of the task are modified) between executions of the workflow, it can be necessary to re-compute the output(s) of the particular task, as well as any tasks that depend on the output of the particular task. For example, if task $n_4$ was modified, re-execution of the workflow would include re-computing $n_4$ as well as any tasks that are dependent on the outputs of $n_4$. The set of tasks dependent on task $n_4$ (distinguished by the dash-dotted line in FIG. 1A) includes tasks $n_6$ and $n_7$. Such tasks may be referred to as "downstream" of task $n_4$.

Conversely, if any task on which a particular task is dependent is modified, it can be necessary to re-compute the particular task (as well as the modified task and any intervening tasks) to take account of the modification. For example, task $n_6$ is dependent on a set of tasks (indicated by the dashed line in FIG. 1A) that includes tasks $n_{1-5}$, such that modifications to any of those "upstream" tasks, or a modification to the source data $n_0$, will result in re-computation of task $n_6$. In another example, task $n_4$ is dependent on a set of tasks (indicated by the dotted line in FIG. 1A) that includes tasks $n_{1-3}$, such that modifications to any of those "upstream" tasks, or a modification to the source data $n_0$, will result in re-computation of task $n_4$.

In a scenario wherein all future modifications to the workflow are known, it is possible to determine an "optimal" set of tasks whose outputs should be stored for later re-use, so as to minimize future compute time and the costs of storing/loading the selected outputs. For example, if it is known that only task $n_6$ will be modified, and that all other tasks will not be modified, only the outputs of tasks $n_4$ and $n_5$ should be stored. This is because the outputs of "upstream" tasks $n_1$, $n_2$, and $n_3$ will not be needed (due to relatively "downstream" tasks $n_4$ and $n_5$ not being modified), the output of task $n_8$ will not be needed as no updated task is "downstream" of it, and the output of task $n_7$ will need to be re-computed as a result of the re-computation (due to modification) of task $n_6$.

However, it is not generally possible to perfectly predict which tasks of a workflow will be modified and so to determine the optimal set of task outputs to store for later loading and re-use. If there were no cost, in storage space, time to store and/or load, and/or computational cycles to store the intermediate outputs of every task in a workflow, then it could be trivially shown that the optimal solution would be to store every task output for possible later re-use. However, this is not the case; the storage space available to store such task outputs is, in practice, limited. Further, the cost, in time, compute cycles, memory bandwidth, or other resources, of storing and later loading task output data for re-use is not zero. It can be the case that, even if storage space were unlimited, it would be preferable to re-compute the output of certain tasks rather than storing and loading them. This can be the case where the task is computationally cheap to perform but that generates a great deal of output data (e.g., concatenating input data together, duplicating input data, zero-order interpolating input data) and/or that is quicker to load from RAM (e.g., when recently generated by a parent task) than to load from non-volatile and/or remote storage. Accordingly, it can be beneficial to determine, for each data processing task in a workflow, whether to store the output of the data processing task for possible later re-use, or to be limited to re-computing the task's output if that output is needed again in a subsequent re-execution of the workflow.

FIG. 1B illustrates the example workflow of FIG. 1A, following execution of the workflow at least once. The outputs of certain of the tasks ($n_2$, $n_3$, $n_4$, $n_5$, $n_7$, and $n_8$) have been stored for possible later re-use (indicated by shading of those tasks). Accordingly, re-execution of the workflow, in response to modifications to the workflow, may be accomplished via loading some of that stored task output rather than by re-computing one or more of the tasks. For example, if task $n_6$ is modified, the output of task $n_6$ could be re-computed based on the preciously stored outputs of tasks $n_3$, $n_4$, and $n_5$ (task $n_7$, being downstream of modified task $n_6$, would also need to be recomputed, based on the stored output of task $n_4$ and on the newly computed output of modified task $n_6$). In another example, wherein task $n_4$ is modified, the previously stored outputs of tasks $n_2$ and $n_3$ can be used to re-compute the output of modified task $n_4$, though the output of task $n_1$ will also need to be re-computed, since that output was not previously stored but is needed as an input to re-compute modified task $n_4$.

The "actual" cost of re-computing a particular data processing task will be a sum of the cost of performing the computation involved in the particular task, the cost of performing the computation involved in task that is upstream of the particular task and whose outputs must be re-computed (due to not being available for loading from storage), and the cost of loading the stored outputs of any upstream tasks whose outputs are available in storage. So, for example, the cost of re-computing task $n_6$, if past outputs are available as shown in FIG. 1B, is the cost of computing task $n_6$ itself and the cost of loading the outputs from tasks $n_3$, $n_4$, and $n_5$. In another example, the cost of re-computing task $n_7$, if past outputs are available as shown in FIG. 1B, is the cost of computing task $n_7$ itself, the cost of computing task $n_6$, and the cost of loading the outputs from tasks $n_3$, $n_4$, and $n_5$ (with the loaded output of task $n_4$ being used to compute both task $n_6$ and task $n_7$). Such an actual cost of re-computation may be compared against, or reduced by, a cost related to the cost of storing the output of a particular task when deciding whether to store the output of the task. For example, if the cost (with respect to computer cycles, memory bandwidth, storage, or some other dimensioned or dimensionless cost consideration) of re-computing a particular data processing task is less than the cost of storing the task's output, the output may be stored for possible later re-use.

In practice, it is beneficial to make decisions about whether to store (or "materialize") the output(s) of a task immediately or soon after execution of the task, since deferring such a decision requires the output(s) to be temporarily stored until the decision is made. Thus, the difficult decision of which task outputs should be stored may need to be made in the moment, on a task-by-task basis, before full execution of the whole workflow and thus based on incomplete data about workflow execution. As shown above, such a decision may be difficult to make without knowing which tasks' outputs will be stored and which will not.

This decision may be simplified by representing the problem as a cost function that can be evaluated during execution of the workflow. Such a cost function can be determined for each data processing task, during execution of a workflow and after generation of the output for each task, and the determined cost function can then be compared to a threshold value (which may be static, or which may vary based on past performance, the amount of storage space available, or some other consideration). If the cost function for a particular data processing task exceeds the threshold (e.g., is less than the threshold, is greater than the threshold), the output of the particular task is stored (or "materialized") for potential later re-use by a future execution of a modified version of the workflow.

A variety of different cost functions may be applied. Such cost functions may include a variety of terms selected to represent the relative or absolute costs of storing the output of a particular data processing task and/or of re-computing the task. Such terms may be expected costs or otherwise approximate the cost of storing and/or of re-computing the data processing task. Such a cost function could be valued in time (e.g., microseconds, processor cycles) or some other variable, or may be a dimensionless value.

For example, the cost function for a particular data processing task could be a cost of performing the computations or other steps involved in executing the particular data processing task. In another example, the cost function for a particular data processing task could be a sum of the cost of performing the computations or other steps involved in executing the particular data processing task along with such costs for data processing tasks upstream of the particular data processing task. This could represent a "worst case" estimate of the actual cost of re-computing a particular data processing task, assuming that none of the task's upstream tasks have outputs stored and available for use without re-computation. Such a cost function may be represented by $$C(n_i) = c(n_i) + \Sigma_{n_j \in ancestors(n_i)} c(n_j)$$

where $C(n_i)$ is the cost function for a data processing task $n_i$, $c(n_x)$ is the cost (e.g., in time, in computer cycles) to re-compute the output of task $n_x$, and ancestors($n_x$) is the set of data processing tasks that are "ancestors" of task $n_x$, i.e., on whose outputs task $n_x$ depends and/or that are "upstream" of task $n_x$. So, for example task $n_6$ of FIG. 1B, this cost would be $c_1+c_2+c_3+c_4+c_5$. Such a cost function may be compared to a threshold value in order to decide whether to store the output of the task for potential future re-use or to discard the task's output. Such a threshold could be related to the cost of storing and re-loading the output during later use, e.g., twice the cost in time or with respect to some other factor of storing the task's output (assuming that the cost of storing the output is approximately equal to the cost of later loading the output from memory for re-use).

The above cost function represents a "worst case scenario" in regard to the availability of stored outputs for upstream tasks for use in re-computing a particular task of a workflow. Instead, each cost function could be determined taking into account whether, at the time of determination of the cost function, each upstream node's output has been stored (and is thus available for loading and re-use in subsequent executions of the workflow) or not. Such a cost function may be represented by $$C(n_i) = c(n_i) + \Sigma_{(n_j \in ancestors(n_i)) \wedge (n_j \in stored(n_i))} c(n_j) + \Sigma_{(n_j \in ancestors(n_i)) \wedge (n_j \in stored(n_i))} l(n_j)$$

where $C(n_i)$ is the cost function for a data processing task $n_i$, $c(n_x)$ is the cost (e.g., in time, in computer cycles) to re-compute the output of task $n_x$, $l(n_x)$ is the cost to load the stored output of task $n_x$ for re-use, stored($n_x$) is the set of data processing tasks whose outputs have, at the time of computation of the cost function, been stored such that those outputs are available for loading and later re-use, and ancestors($n_x$) is the set of data processing tasks that are "ancestors" of task $n_x$, i.e., on whose outputs task $n_x$ depends and/or that are "upstream" of task $n_x$.

The cost term for computing the cost for re-computing the output of a particular data processing task, or for storing/loading the particular task's output to/from memory, could be determined and/or specified in a variety of ways. In some examples, the cost (e.g., time) of one or more past computations and/or storings/loadings of the task's output could be observed and used to determine the cost term (e.g., by averaging more than one observed past computations/storings/loadings). Additionally or alternatively, the cost term could be determined based on a size of the input(s) to the task, a configuration of the task (e.g., a number of units and/or layers of an artificial neural network whose execution is part of the task), or some other information about the task.

Such a cost function could be modified or augmented in a variety of ways. For example, the output of a particular task could not be stored if the size of that output is greater than an amount of storage space available at the time of computation of the output. In another example, the cost function could include terms relating to the likelihood that particular data processing tasks are likely to be modified, re-computed, or relied upon for re-computing a downstream task, or a likelihood of some other circumstance related to a task and the utility of storing its output for later re-use. For example, if it was determined that a particular task was very likely to be modified in the next iteration of a workflow, it could be determined not to store that task's output for future re-use (since it was determined to be very unlikely that the particular task will not be modified and thus that the task's output might be valid for re-use). In some cases, tunable weights may be applied to the component terms of the cost function.

Accordingly, a workflow can be executed and the outputs of selected data processing tasks thereof stored for possible later re-use. Subsequently, it may be beneficial to re-execute the workflow, e.g., in response to receiving a modification to the workflow in order to assess the efficacy of the modification in improving the workflow with respect to accuracy of a predictive output of with respect to some other consideration of interest. In such a scenario, it is desirable to reduce the amount of re-computation of data processing tasks of the workflow by using outputs of the data processing tasks that were previously stored as describe above.

Accordingly, it can be beneficial to determine, for each task of the workflow, whether to load a previously stored output of the task, to re-compute the output of the task, or to do neither for the task (which may be referred to as "pruning" the task). Tasks of the workflow that have been modified (e.g., that have had one or more parameters modified, that have been added to the workflow, that have the source or other properties of one or more inputs to the task modified) will be set for re-computation, as modification to a task means that any previously stored output for that task cannot be re-used. Similarly, any task dependent upon such a modified task (i.e., any tasks "downstream" of such a modified task) will need to be re-computed, since at least one input of such a task will have been updated due to the re-computation of at least one task that is "upstream."

Traveling "upstream" from a task to be re-computed, any tasks having valid previously stored outputs may have those outputs loaded and re-used. If such a stored output is not available for an upstream task, the upstream task is set to re-compute. The process continues upstream from such a task until either the beginning of the workflow (e.g., a set of course data) is reached or an upstream task is dependent upon inputs from further upstream tasks all of which have available valid previously-stored outputs that can be loaded and re-used. Alternatively, other methods of assigning re-compute, load, or other states to tasks of a workflow may be applied (e.g., as described in the "Experimental Results" section below).

Any tasks which are not set to be either re-computed or to have a valid, previously-stored output loaded for re-use may be set to some other status, e.g., "pruned." This is because such a task does not need to be re-computed or to have a stored output loaded because the output of such a task is not needed to re-compute the output of any downstream task, nor has any input to such a task been affected by modifying any task upstream of the task.

As an example, FIG. 1C shows the workflow of FIG. 1A, after the workflow has been executed and the outputs of the tasks indicated in FIG. 1B have been stored for possible future re-use. A modification to the workflow is received that contains a modification of task $n_7$ (e.g., a modification to one or more configuration parameters defining the structure or behavior of task $n_7$). Accordingly, task $n_7$ is set to re-computed (indicated, in FIG. 1C, by cross-hatching). Any task dependent on an input from task $n_7$ (none shown) would also be set to be re-computed, based on the new output determined from task $n_7$. Task $n_4$ is set to load its previously stored output (indicated in FIG. 1C by one-directional hatching) for use in re-computing the output of task $n_7$. However, there is no previously stored output available for upstream task $n_6$, and so task $n_6$ is set to re-compute. Accordingly, it is necessary to secure inputs needed to re-compute task $n_6$. The tasks immediately upstream from task $n_6$ (i.e., tasks $n_3$, $n_4$, and $n_5$) all have valid, previously stored outputs available for loading and re-use, and so those tasks are set to load their previously stored outputs. If any of these upstream tasks lacked such previously stored outputs, those tasks would have been set to re-compute, and the process would have continued upstream until the root data source of the workflow was reached, or until valid previously stored task outputs were found.

Since tasks $n_1$ and $n_2$ are upstream of previously stored task outputs that are, themselves, needed to re-compute at least one updated task, they are set to "prune" (or otherwise set to a status other than "re-compute" or "load stored output"). Since there is no updated task downstream of task $n_8$, it is also set to "prune."

A modification to a workflow can result in a change in the accuracy of the workflow (e.g., with respect to predicting an observed experimental effect, with respect to predicting a "ground truth" classification output), in a false-negative rate of the workflow or of a component thereof, in a true-positive rate of the workflow or of a component thereof, in a degree of observed over-fitting of the workflow or of a component thereof with respect to a set of input data, or with respect to some other summary parameter or parameters of interest. Accordingly, such parameters may be determined for each modification to the workflow (e.g., as part of the execution of the workflow) and presented to a human user (e.g., on a screen of a display or other user interface). The human user may then use the determined parameter(s) to assess the efficacy of modifications to the workflow, to make additional modifications to the workflow, to decide that the workflow is satisfactory and to cease modifying the workflow, or to take some other action. By applying the methods described herein, a system may execute and assess modifications to such a workflow in a shorter period of time, reducing the computational and time cost of such iterative workflow development, improving the ability of human users to assess the impact of modifications to a workflow or other otherwise engage in such iterative workflow development, or to provide some other benefits.

In some examples, a system configured to execute, modify, and otherwise interact with workflows as described herein may perform additional functions to facilitate iterative workflow development. For example, such a system could include models of human user interaction with workflows, allowing the system to provide the user with suggested modifications to a workflow (e.g., based on modifications made by more experienced users, based on analytics capable of identifying beneficial modifications to workflows). A user could then act to accept such suggested modifications, causing the system to re-execute the workflow as modified per the suggestion. Additionally or alternatively, such a system could predict one or more modifications that a user is likely to make to a workflow following an execution of the workflow. The system could then, prior to receiving any confirmatory input from the user, execute one or more workflows modified according to the predicted modifications In the event that the user selects a modification corresponding to one of the predicted modifications, the system could then provide the user with a result of the already-in-progress execution of a workflow that has been modified in correspondence with the selected modification. This can result in a further reduction in the latency between the user's selection of a modification of the workflow to be assessed and the system providing the user with the results of that modification (e.g., to a latency of essentially zero in examples wherein the predicted modification has completed execution prior to the user making a selection).

II. EXAMPLE METHODS

Figure 1D:
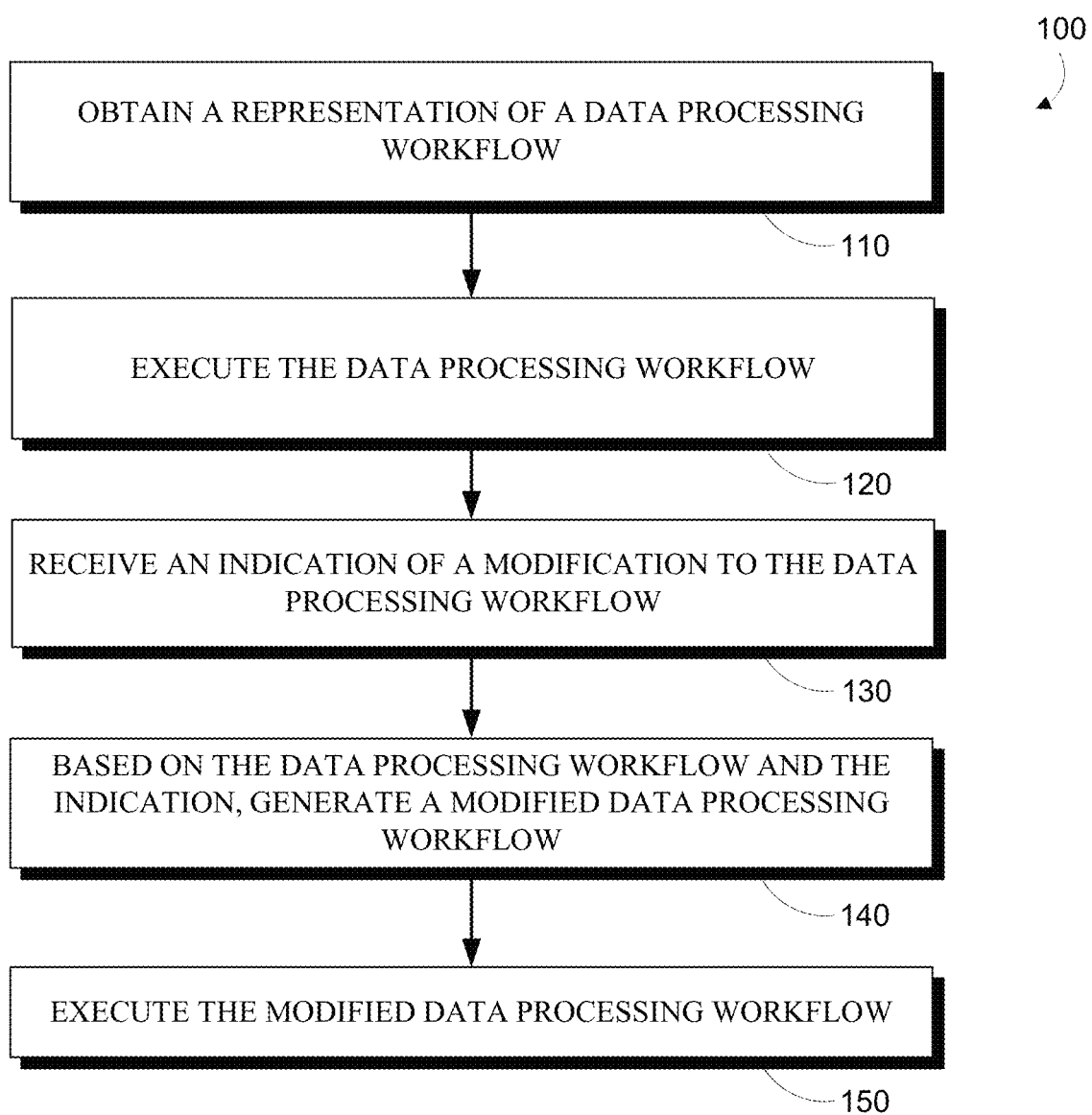
FIG. 1D is a flowchart of an example method.

FIG. 1D is a flowchart of an example method 100. The method 100 includes obtaining a representation of a data processing workflow (110). The data processing workflow includes a plurality of data processing tasks and directed data dependencies exist between pairs of the data processing tasks and between portions of target data and instances of the data processing tasks. The data processing workflow could be a machine learning workflow and/or could include machine learning execution and/or training steps.

The method 100 additionally includes executing the data processing workflow (120). Executing the data processing workflow includes, for a particular data processing task of the plurality of data processing tasks, storing an output of the particular data processing task to a data storage. This could include storing the output of multiple data processing tasks, or even storing the output of all of the data processing tasks. Storing the output of the particular data processing task could be performed responsive to determining that a cost function for the particular step exceeds (e.g., is less then, is greater than) a specified threshold. Such a cost function could be determined based on a difference in cost between loading/storing the output of the particular step and a cost of re-computing the particular step, and/or a sum of such costs for loading/storing and/or re-computing steps that directly or indirectly depend from the particular step.

The method 100 additionally includes receiving an indication of a modification to the data processing workflow (130). The method 100 additionally includes, based on the data processing workflow and the indication, generating a modified data processing workflow (140).

The method 100 additionally includes executing the modified data processing workflow (150). Executing the modified data processing workflow includes (i) loading the output of the particular data processing task, and (ii) using the output to determine an output of a different data processing task of the plurality of data processing tasks.

The method 100 could include any additional elements or features described herein.

III. EXPERIMENTAL RESULTS

1 Introduction

Machine learning workflow development is a process of trial-and-error: developers iterate on workflows by testing out small modifications until the desired accuracy is achieved. Unfortunately, existing machine learning systems focus narrowly on model training—a small fraction of the overall development time—and neglect to address iterative development. We propose HELIX, a machine learning system that optimizes the execution across iterations—intelligently caching and reusing, or recomputing intermediates as appropriate. HELIX captures a wide variety of application needs within its Scala DSL, with succinct syntax defining unified processes for data preprocessing, model specification, and learning. We demonstrate that the reuse problem can be cast as a MAX-FLOW problem, while the caching problem is NP-HARD. We develop effective lightweight heuristics for the latter. Empirical evaluation shows that HELIX is not only able to handle a wide variety of use cases in one unified workflow but also much faster, providing run time reductions of up to 19× over state-of-the-art systems, such as DeepDive or KeystoneML, on four real-world applications in natural language processing, computer vision, social, and natural sciences.

From emergent applications like precision medicine, voice-controlled devices, and driverless cars, to well-established ones like product recommendations and credit card fraud detection, machine learning continues to be the key driver of innovations that are transforming our everyday lives. At the same time, developing machine learning applications is time-consuming and cumbersome.

However, the majority of the development time is in fact spent iterating on the machine learning workflow by incrementally modifying steps within, including (i) preprocessing: altering data cleaning or extraction, or engineering features; (ii) model training: tweaking hyperparameters, or changing the objective or learning algorithm; and (iii) post-processing: evaluating with new data, or generating additional statistics or visualizations. These iterations are necessitated by the difficulties in predicting the performance of a workflow a priori, due to both the variability of data and the complexity and unpredictability of machine learning. Thus, developers must resort to iterative modifications of the workflow via "trial-and-error" to improve performance. A recent survey reports that less than 15% of development time is actually spent on model training, with the bulk of the time spent iterating on the machine learning workflow.

As an illustrative example, machine learning has been applied to the prediction of gene function. The goal of such predictions is to discover novel relationships between genes and diseases by mining scientific literature. To do so, published papers are processed to extract entity—gene and disease—mentions, compute embeddings using an approach like word2vec, and finally cluster the embeddings to find related entities. This workflow is repeatedly iterated to improve the quality of the relationships discovered as assessed by collaborating clinicians. Example modifications include: (i) expand or shrink the literature corpus, (ii) add in external sources such as gene databases to refine how entities are identified, and (iii) try different NLP libraries for tokenization and entity recognition. One may also (iv) change the algorithm used for computing word embedding vectors, e.g., from word2vec to LINE, or (v) tweak the number of clusters to control the granularity of the clustering.

Every single change made necessitates waiting for the entire workflow to rerun from scratch—often multiple hours on a large server for each single change, even though the change may be quite small.

As this example illustrates, the key bottleneck in applying machine learning is iteration—every change to the workflow requires hours of recomputation from scratch, even though the change may only impact a small portion of the workflow. For instance, normalizing a feature, or changing the regularization would not impact the portions of the workflow that do not depend on it—and yet the current approach is to simply rerun from scratch.

One approach to address the expensive recomputation issue is for developers to explicitly materialize all intermediates that do not change across iterations, but this requires writing code to handle materialization and to reuse materialized results by identifying changes between iterations. Even if this were a viable option, materialization of all intermediates is extremely wasteful, and figuring out the optimal reuse of materialized results is not straightforward.

Due to the cumbersome and inefficient nature of this approach, developers often opt to rerun the entire workflow from scratch. Unfortunately, existing machine learning systems do not optimize for rapid iteration. For example, KeystoneML, which allows developers to specify workflows at a high-level abstraction, only optimizes the one-shot execution of workflows by applying techniques such as common subexpression elimination and intermediate result caching. On the other extreme, DeepDive, targeted at knowledge-base construction, materializes the results of all of the feature extraction and engineering steps, while also applying approximate inference to speed up model training. Although this naïve materialization approach does lead to reuse in iterative executions, it is wasteful and time-consuming.

We present HELIX, a declarative, general-purpose machine learning system that optimizes across iterations. HELIX is able to match or exceed the performance of KeystoneML and DeepDive on oneshot execution, while providing gains of up to 19× on iterative execution across four real-world applications. By optimizing across iterations, HELIX allows data scientists to avoid wasting time running the workflow from scratch every time they make a change and instead run their workflows in time proportional to the complexity of the change made. HELIX is able to thereby substantially increase developer productivity while simultaneously lowering resource consumption.

Developing HELIX involves two types of challenges—challenges in iterative execution optimization and challenges in specification and generalization.

Challenges in Iterative Execution Optimization.

A machine learning workflow can be represented as a directed acyclic graph, where each node corresponds to a collection of data—the original data items, such as documents or images, the transformed data items, such as sentences or words, the extracted features, or the final outcomes. This graph, for practical workflows, can be quite large and complex. One simple approach to enable iterative execution optimization (adopted by DeepDive) is to materialize every single node, such that the next time the workflow is run, one can simply check if the result can be reused from the previous iteration, and if so, reuse it. Unfortunately, this approach is not only wasteful in storage but also potentially very time-consuming due to materialization overhead. Moreover, in a subsequent iteration, it may be cheaper to recompute an intermediate result, as opposed to reading it from disk.

A better approach is to determine whether a node is worth materializing by considering both the time taken for computing a node and the time taken for computing its ancestors. Then, during subsequent iterations, we can determine whether to read the result for a node from persistent storage (if materialized), which could lead to large portions of the graph being pruned, or to compute it from scratch. The reuse plan problem is in PTIME via a non-trivial reduction to MAX-FLOW using the PROJECT SELECTION PROBLEM, while the materialization problem is, in fact, NP-HARD.

Challenges in Specification and Generalization.

To enable iterative execution optimization, it is beneficial to support the specification of the end-to-end machine learning workflow in a high-level language. This is challenging because data preprocessing can vary greatly across applications, often requiring ad hoc code involving complex composition of declarative statements and UDFs, making it hard to automatically analyze the workflow to apply holistic iterative execution optimization.

HELIX employs a hybrid approach: developers specify their workflow in an intuitive, high-level domain-specific language (DSL) in Scala, using imperative code as needed for UDFs, say for feature engineering.

This interoperability allows developers to seamlessly integrate existing JVM machine learning libraries. Moreover, HELIX is built on top of Spark, allowing data scientists to leverage Spark's parallel processing capabilities. A developed GUI has been developed on top of the HELIX DSL to further facilitate development.

HELIX's DSL not only enables automatic identification of data dependencies and data flow, but also encapsulates all typical machine learning workflow designs. Unlike DeepDive, HELIX is not restricted to regression or factor graphs, allowing data scientists to use the most suitable model for their tasks. All of the functions in Scikit-learn's (a popular ML toolkit) can be mapped to functions in the DSL, allowing HELIX to easily capture applications ranging from natural language processing, to knowledge extraction, to computer vision. Moreover, by studying the variation in the dataflow graph across iterations, HELIX is able to identify reuse opportunities across iterations. The work described herein is a first step in a broader agenda to improve human-in-the-loop ML.

Outline.

The rest of these experimental results are organized as follows: Section 2 presents a quick overview of ML workflows, statistics on how users iteration on ML workflows collected from applied ML literature, an architectural overview of the system, and a concrete workflow to illustrate concepts discussed in the subsequent sections; Section 3 describes the programming interface for effortless end-to-end workflow specification; Section 4 discusses HELIX system internals, including the workflow DAG generation and change tracking between iterations; Section 5 formally presents the two major optimization problems in accelerating iterative ML and HELIX's solution to both problems.

The framework is analyzed on four workflows from different applications domains and against two state-of-the-art systems in Section 6.

2 Background and Overview

In this section, a brief overview of machine learning workflows is provided, as is a description of the HELIX system architecture and a sample workflow in HELIX that will serve as a running example.

A machine learning (ML) workflow accomplishes a specific ML task, ranging from simple ones like classification or clustering, to complex ones like entity resolution or image captioning. Within HELIX, ML workflows are decomposed into three components: data preprocessing (DPR), where raw data is transformed into ML-compatible representations, learning/inference (L/I), where ML models are trained and used to perform inference on new data, and postprocessing (PPR), where learned models and inference results are processed to obtain summary metrics, create dashboards, and power applications.

Specific operations in each of these components are discussed in Section 3. As illustrated herein, these three components are generic and sufficient for describing a wide variety of supervised, semi-supervised, and unsupervised settings.

2.1 System Architecture

Figure 2:
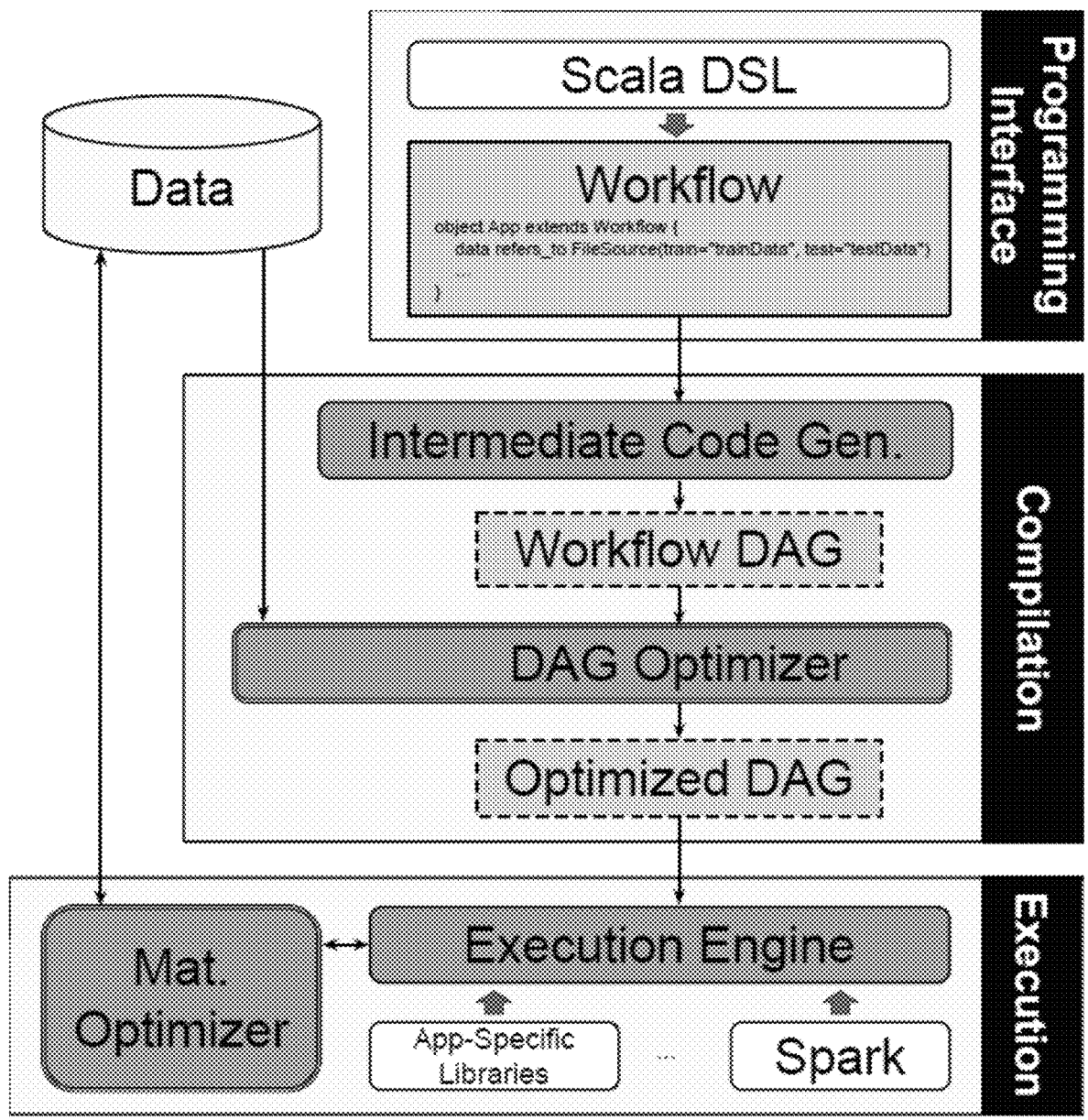
FIG. 2 illustrates an example data processing workflow execution and development process and system.

The HELIX system consists of a domain specific language (DSL) in Scala as the programming interface, a compiler for the DSL, and an execution engine, as shown in FIG. 2. FIG. 2 illustrates an example of the HELIX System architecture. A program written by the user in the HELIX DSL, known as a Workflow, is first compiled into an intermediate DAG representation, which is optimized to produce a physical plan to be run by the execution engine. At runtime, the execution engine selectively materializes intermediate results to disk. The three components work collectively to minimize the execution time for both the current iteration and subsequent iterations:

Programming Interface (Section 3).

HELIX provides a single Scala interface named Workflow for programming the entire workflow; the HELIX DSL also enables embedding of imperative code in declarative statements. Through just a handful of extensible operator types, the DSL supports a wide range of use cases for both data preprocessing and machine learning.

Compilation (Sections 4, 5.1-5.2).

A Workflow is internally represented as a directed acyclic graph (DAG) of operator outputs. The DAG is compared to the one in previous iterations to determine reusability (Section 4). The DAG Optimizer uses this information to produce an optimal physical execution plan that minimizes the one-shot runtime of the workflow, by selectively loading previous results via a MAX-FLOW-based algorithm (Section 5.1-5.2).

Execution Engine (Section 5.3).

The execution engine carries out the physical plan produced during the compilation phase, while communicating with the materialization operator to materialize intermediate results, to minimize runtime of future executions. The execution engine uses Spark for data processing and domain-specific libraries such as CoreNLP and Deeplearning4j for custom needs. HELIX defers operator pipelining and scheduling for asynchronous execution to Spark. Operators that can run concurrently are invoked in an arbitrary order, executed by Spark via Fair Scheduling. While by default Spark is used in the batch processing mode, it can be configured to perform stream processing using the same APIs as batch. Optimizations for streaming are discussed in Section 5.

2.2 The Workflow Lifecycle

Figure 3:
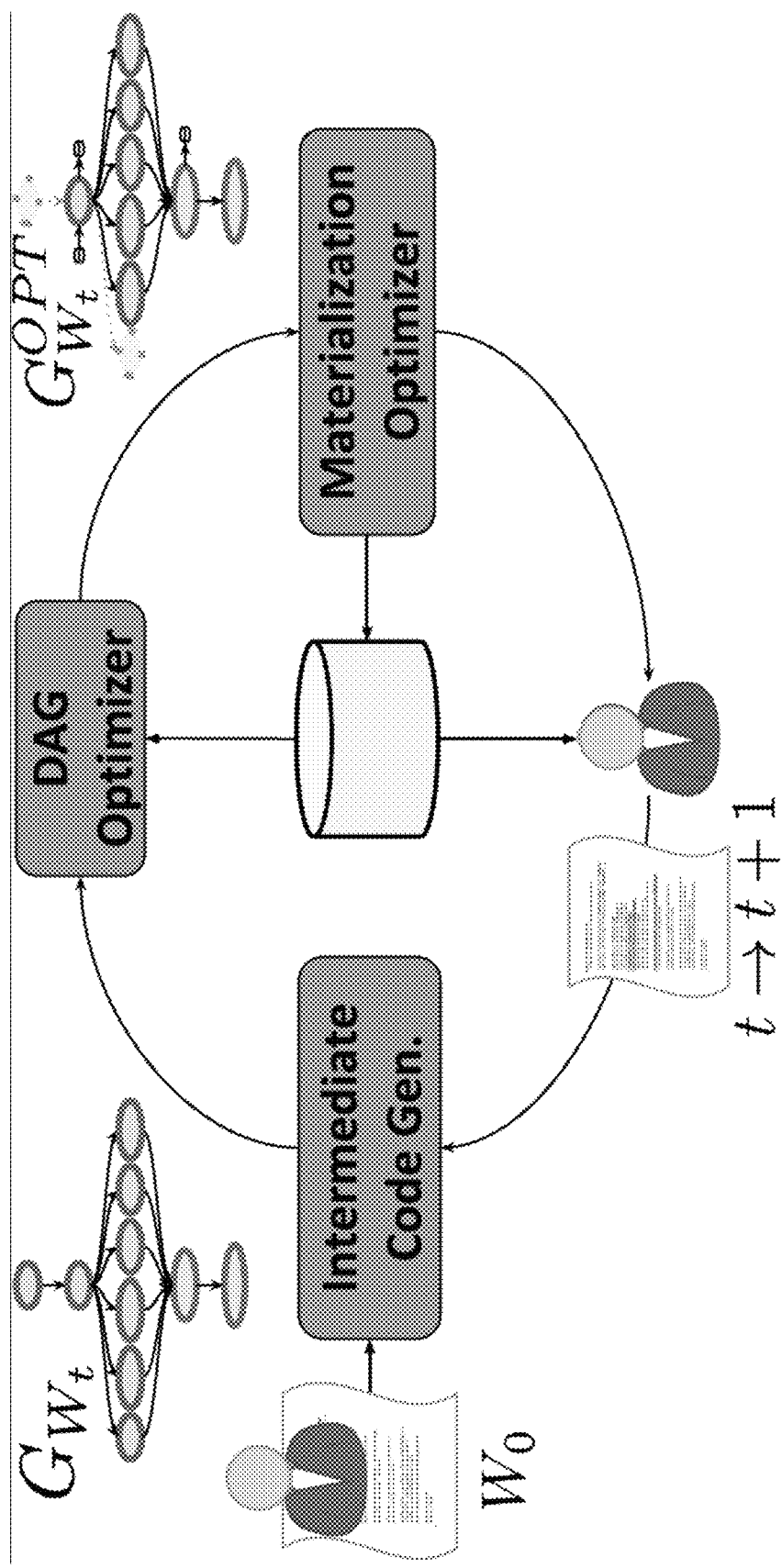
FIG. 3 illustrates an example iterative process of workflow development.

Considering the system components described in the previous section, FIG. 3 illustrates how they fit into the lifecycle of ML workflows. Starting with $W_0$, an initial version of the workflow, the lifecycle includes the following stages:

DAG Compilation.

The Workflow $W_t$ is compiled into a DAG $G_{W_t}$ of operator outputs.

DAG Optimization.

The DAG optimizer creates a physical plan $G^{OPT}_{W_t}$ to be executed by pruning and ordering the nodes in $G_{W_t}$ and deciding whether any computation can be replaced with loading previous results from disk.

Materialization Optimization.

During execution, the materialization optimizer determines which nodes in $G^{OPT}_{W_t}$ should be persisted to disk for future use.

User Interaction.

Upon execution completion, the user may modify the workflow from $W_t$ to $W_{t+1}$ based on the results. The updated workflow $W_{t+2}$ fed back to HELIX marks the beginning of a new iteration, and the cycle repeats.

Without loss of generality, one can assume that a workflow $W_t$ is only executed once in each iteration. A repeated execution of $W_t$ can be modelled as a new iteration where $W_{t+1}=W_t$. Distinguishing two executions of the same workflow is important because they may have different run times—the second execution can reuse results materialized in the first execution for a potential run time reduction.

2.3 Example Workflow

Figure 4:
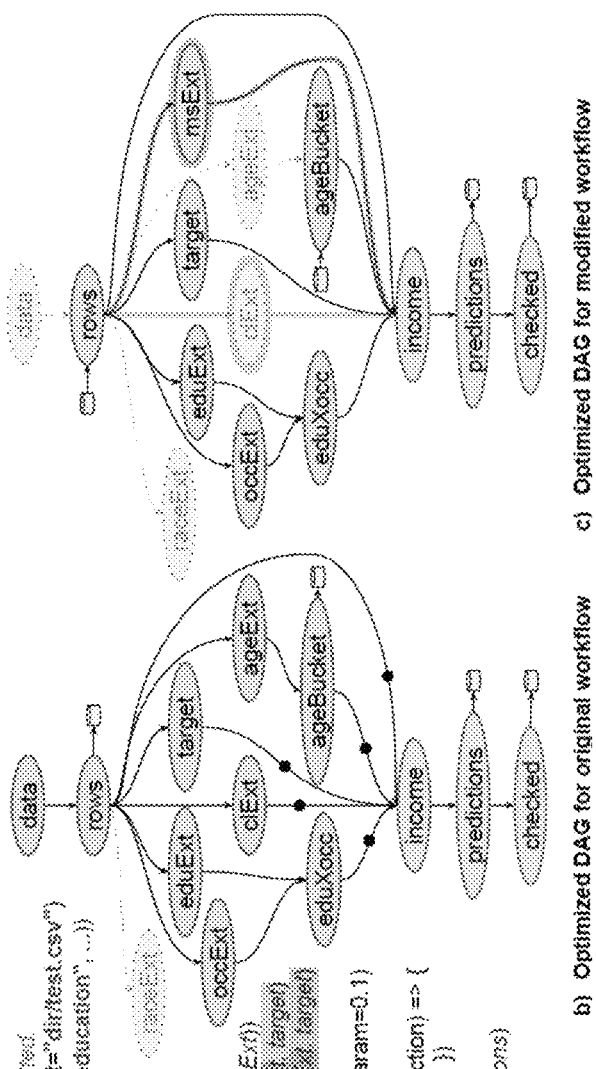
FIG. 4 illustrates an example algorithm and its use in selectively storing and/or re-computing the results of steps of a data processing workflow.

The usage of HELIX is illustrated here with a simple example ML workflow for predicting income using census data from Kohavi, shown in FIG. 4, frame a); this workflow will serve as a running example throughout these experimental results. Details about the individual operators will be provided in subsequent sections. The original workflow was overlaid with an iterative update, with additions annotated with + and deletions annotated with -, while the rest of the lines are retained as is. The original workflow includes all the unannotated lines plus the line annotated with - (deletions).

Original Workflow: DPR Steps. First, after some variable name declarations, the user defines in line 3-4 as data collection rows read from a data source data consisting of two CSV files, one for training and one for test data, and names the columns of the CSV files age, education, etc. In lines 5-10, the user declares simple features that are values from specific named columns. Note that the user is not required to specify the feature type, which is automatically inferred by HELIX from data. In line 11 ageBucket is declared as a derived feature formed by discretizing age into ten buckets (whose boundaries are computed by HELIX), while line 12 declares an interaction feature, commonly used to capture higher order patterns, formed out of the concatenation of eduExt and occExt.

Once the features are declared, the next step, line 13, declares the features to be extracted from and associated with each element of rows. Users do not need to worry about how these features are attached and propagated; users are also free to perform manual feature selection here, studying the impact of various feature combinations, by excluding some of the feature extractors. Finally, as a last step of data preprocessing, line 14 declares that an example collection named income is to be made from rows using target as labels. Importantly, this step converts the features from human readable formats (e.g., color=red) into an indexed vector representation required for learning.

Original Workflow: L/I & PPR Steps.

Line 15 declares an ML model named incPred with type "Logistic Regression" and regularization parameter 0.1, while line 16 specifies that incPred is to be learned on the training data in income and applied on all data in income to produce a new example collection called predictions. Line 17-18 declare a reducer named checkResults, which outputs a scalar using a UDF for computing prediction accuracy. Line 19 explicitly specifies checkResults's dependency on target since the content of the UDF is opaque to the optimizer. Line 20 declares that the output scalar named checked is only to be computed from the test data in income. Lines 21 declares that checked must be part of the final output.

Original Workflow: Optimized DAG.

The HELIX compiler first translates verbatim the program in FIG. 4, frame a) into a DAG, which contains all nodes including raceExt and all edges (including the dashed edge) except the ones marked with dots in FIG. 4, frame b). This DAG is then transformed by the optimizer, which prunes away raceExt (grayed out) because it does not contribute to the output, and adds the edges marked by dots to link relevant features to the model. Nodes with a drum to the right are materialized to disk, either as mandatory output or for aiding in future iterations.

Updated Workflow: Optimized DAG.

In the updated version of the workflow, a new feature named msExt is added (below line 9), and clExt is removed (line 13); correspondingly, in the updated DAG, a new node is added for msExt, while clExt gets pruned. In addition, HELIX chooses to load materialized results for rows from the previous iteration allowing data to be pruned, avoiding a costly parsing step HELIX also loads age-Bucket instead of recomputing the bucket boundaries requiring a full scan. HELIX materializes predictions in both iterations since it has changed. Although predictions is not reused in the updated workflow, its materialization has high expected payoff over iterations because PPR iterations (changes to checked in this case) are the most common as per our survey results.

This example illustrates that:

Nodes selected for materialization lead to significant speedup in subsequent iterations.

HELIX reuses results safely, deprecating old results when changes are detected (e.g., predictions is not reused because of the model change).

HELIX correctly prunes away extraneous operations via dataflow analysis.

3. Programming Interface

To program ML workflows with high-level abstractions, HELIX users program in a language called HML, an embedded DSL in Scala. An embedded DSL exists as a library in the host language (Scala in this case), leading to seamless integration. LINQ, a data query framework integrated in .NET languages, is another example of an embedded DSL. In HELIX, users can freely incorporate Scala code for user-defined functions (UDFs) directly into HML. JVM-based libraries can be imported directly into HML to support application-specific needs. Development in other languages can be supported with wrappers in the same style as PySpark.

3.1 Operations in ML Workflows

In this section, it is demonstrated that common operations in ML workflows can be decomposed into a small set of basis functions F. F is introduced and then its mapping onto operations in Scikit-learn, one of the most comprehensive ML libraries, is enumerated thereby demonstrating coverage. In Section 3.2, HML is introduced, which implements the capabilities offered by F.

As mentioned in Section 2, an ML workflow includes three components: data preprocessing (DPR), learning/inference (L/I), and postprocessing (PPR). They are captured by the Transformer, Estimator, and Predictor interfaces in Scikit-learn, respectively. Similar interfaces can be found in many ML libraries, such as MLLib, TFX, and KeystoneML.

Data Representation.

Conventionally, the input space to ML, X, is a d-dimensional vector space, $R^d$; $d \geq 1$, where each dimension corresponds to a feature. Each datapoint is represented by a feature vector (FV), $x \in R^d$. For notational convenience, a d-dimensional FV, $x \in R^d$, is denoted as $x^d$. While inputs in some applications can be easily loaded into FVs, e.g., images are 2D matrices that can be flattened into a vector, many others require more complex transformations, e.g., vectorization of text requires tokenization and word indexing. The input dataset of FVs to an ML algorithm is denoted as D.

DPR.

The goal of DPR is to transform raw input data into D. The term record, denoted by r, is used to refer to a data object in formats incompatible with ML, such as text and JSON, requiring preprocessing. Let S={r} be a data source, e.g., a csv file, or a collection of text documents. DPR includes transforming records from one or more data sources from one format to another or into FVs $R^{d'}$; as well as feature transformations (from $R^d$ to $R^{d'}$). DPR operations can thus be decomposed into the following categories:

Parsing r→(r1; r2; . . . ): transforming a record into a set of records, e.g., parsing an article into words via tokenization.

Join (r1; r2; . . . )→r: combining multiple records into a single record, where $r_i$ can come from different data sources.

Feature Extraction r→$x^d$: extracting features from a record.

Feature Transformation T: $x^d$→$x^{d'}$: deriving a new set of features from the input features.

Feature Concatenation ($x^{d1}$, $x^{d2}$, . . . )→$x^{\Sigma_i \, d_i}$: concatenating features extracted in separate operations to form an FV.

Note that sometimes these functions need to be learned from the input data. For example, discretizing a continuous feature $x_i$ into four even-sized bins requires the distribution of $x_i$, which is usually estimated empirically by collecting all values of $x_i$ in D. This use case along with L/I is addressed next.

L/I.

At a high-level, LIT is about learning a function $f$ from the input D, where $f: X \to R^{d'}$; $d' \geq 1$. This is more general than learning ML models, and also includes feature transformation functions mentioned above. The two main operations in L/I are 1) learning, which produces functions using data from D, and 2) inference, which uses the function obtained from learning to draw conclusions about new data. Complex ML tasks can be broken down into simple learning steps captured by these two operations, e.g., image captioning can be broken down into object identification via classification, followed by sentence generation using a language model.

Thus, L/I can be decomposed into:

Learning D→f; learning a function $f$ from the dataset D.

Inference (D;f)→Y: using the ML model $f$ to infer feature values, i.e., labels, Y from the input FVs in D.

Note that labels can be represented as FVs like other features, hence the usage of a single D in learning to represent both the training data and labels to unify the abstraction for both supervised and unsupervised learning and to enable easy model composition.

PPR.

Finally, a wide variety of operations can take place in PPR, using the learned models and inference results from L/I as input, including model evaluation, data visualization, and other application specific activities. The most commonly supported PPR operations in general purpose ML libraries are model evaluation and model selection, which can be represented by a computation whose output does not depend on the size of the data D. We refer to a computation with output sizes independent of input sizes as a "reduce":

Reduce (D; s')→s: applying an operation on the input dataset D and $s_0$, where $s_0$ can be any non-dataset object. For example, $s_0$ can store a set of hyperparameters over which reduce optimizes, learning various models and outputting s, which can represent a function corresponding to the model with the best cross-validated hyperparameters.

3.1.1 Comparison with Scikitlearn

A dataset in Scikit-learn is represented as a matrix of FVs, denoted by X. This is conceptually equivalent to D={$x^d$} introduced earlier, as the order of rows in X is not relevant. Operations in Scikit-learn are categorized into dataset loading and transformations, learning, and model selection and evaluation. Operations like loading and transformations that do not tailor their behavior to particular characteristics present in the dataset D map trivially onto the DPR basis functions $\epsilon$ F introduced at the start of Section 3.1, so we focus on comparing data-dependent DPR and L/I, and model selection and evaluation.

Scikit-learn Operations for DPR and L/I.

Scikit-learn objects for DPR and L/I implement one or more of the following interfaces:

Estimator, used to indicate that an operation has data-dependent behavior via a fit(X[, y]) method, where X contains FVs or raw records, and y contains labels if the operation represents a supervised model.

Predictor, used to indicate that the operation may be used for inference via a predict(X) method, taking a matrix of FVs and producing predicted labels. Additionally, if the operation implementing Predictor is a classifier for which inference may produce raw floats (interpreted as probabilities), it may optionally implement predict_proba.

Transformer, used to indicate that the operation may be used for feature transformations via a transform(X) method, taking a matrix of FVs and producing a new matrix $X_{new}$.

An operation implementing both Estimator and Predictor has a fit_predict method, and an operation implementing both Estimator and Transformer has a fit_transform method, for when inference or feature transformation, respectively, is applied immediately after fitting to the data. The rationale for providing a separate Estimator interface is likely due to the fact that it is useful for both feature transformation and inference to have data-dependent behavior determined via the result of a call to fit. For example, a useful data-dependent feature transformation for a Naive Bayes classifier maps word tokens to positions in a sparse vector and tracks word counts. The position mapping will depend on the vocabulary represented in the raw training data. Other examples of data-dependent transformations include feature scaling, descretization, imputation, dimensionality reduction, and kernel transformations.

Coverage in Terms of Basis Functions F.

Scikit-learn's interfaces for DPR and L/I can be mapped to (compositions of) basis functions from F. In particular, note that there is nothing special about Scikit-learn's use of separate interfaces for inference (via Predictor) and data-dependent transformations (via Transformer); the separation exists mainly to draw attention to the semantic separation between DPR and L/I.

Scikit-Learn Operations for PPR.

Scikit-learn interfaces for operations implementing model selection and evaluation are not as standardized as those for DPR and L/I. For evaluation, the typical strategy is to define a simple function that compares model outputs with labels, computing metrics like accuracy or $F_1$ score. For model selection, the typical strategy is to define a class that implements methods fit and score. The fit method takes a set of hyperparameters over which to search, with different models scored according to the score method (with identical interface as for evaluation in Scikit-learn). The actual model over which hyperparameter search is performed is implemented by an Estimator that is passed into the model selection operation's constructor.

Coverage in Terms of Basis Functions F.

Scikit-learn's operations for evaluation may be implemented via compositions of (optionally) inference, joining, and reduce $\in$ F. Model selection may be implemented via a reduce that internally uses learning basis functions to learn models for the set of hyperparameters specified by $s_0$, followed by composition with inference and another reduce $\epsilon$F for scoring, eventually returning the final selected model.

3.2 HTML

HML is a declarative language for specifying an ML workflow DAG. The basic building blocks of HML are HELIX objects, which correspond to the nodes in the DAG. Each HELIX object is either a data collection (DC) or an operator. Statements in HML either declare new instances of objects or relationships between declared objects. Users program the entire workflow in a single Workflow interface, as shown in FIG. 4, frame a). The complete grammar for HML in Backus-Naur Form as well as the semantics of all of the expressions can be found elsewhere. Here, we describe high-level concepts including DCs and operators.

3.2.1 Data Collections

A data collection (DC) is analogous to a relation in a RDBMS; each element in a DC is analogous to a tuple. The content of a DC either derives from disk, e.g., data in Line 3 in FIG. 4, frame a), or from operations on other DCs, e.g., rows in Line 4 in FIG. 4, frame a). An element in a DC can either be a semantic unit, the data structure for DPR, or an example, the data structure for L/I.

A DC can only contain a single type of element. DCSU and DCE denote a DC of semantic units and a DC of examples, respectively. The type of elements in a DC is determined by the operator that produced the DC and not explicitly specified by the user. We elaborate on the relationship between operators and element types in Section 3.2.2, after introducing the operators.

Semantic Units.

Recall that many DPR operations require going through the entire dataset to learn the exact transformation or extraction function. For a workflow with many such operations, processing D to learn each operator separately can be highly inefficient. We introduce the notion of semantic units (SU)

to compartmentalize the logical and physical representations of features, so that the learning of DPR functions can be delayed and batched.

Formally, each SU contains an input i, which can be a set of records or FVs, a pointer to a DPR function $f$, which can be of type parsing, join, feature extraction, feature transformation, or feature concatenation, and an output o, which can be a set of records or FVs and is the output of $f$ on i. The variables i and $f$ together serve as the semantic, or logical, representation of the features, whereas o is the lazily evaluated physical representation that can only be obtained after $f$ is fully instantiated.

EXAMPLES

Examples gather all the FVs contained in the output of various SUs into a single FV for learning. Formally, an example contains a set of SUs S, and an optional pointer to one of the SUs whose output will be used as the label in supervised settings, and an output FV, which is formed by concatenating the outputs of S. In the implementation, the order of SUs in the concatenation is determined globally across D, and SUs whose outputs are not FVs are filtered out.

Sparse vs. Dense Features.

The combination of SUs and examples affords HELIX a great deal of flexibility in the physical representation of features. Users can explicitly program their DPR functions to output dense vectors, in applications such as computer vision. For sparse categorical features, they are kept in the raw key-value format until the final FV assembly, where they are transformed into sparse or dense vectors depending on whether the ML algorithm supports sparse representations. Note that users do not have to commit to a single representation for the entire application, since different SUs can contain different types of features. When assembling a mixture of dense and spare FVs, HELIX currently opts for a dense representation but can be extended to support optimizations considering space and time tradeoffs.

Unified Learning Support.

HML provides unified support for training and test data by treating them as a single DC, as done in Line 4 in FIG. 4, frame a). This design ensures that both training and test data undergo the exact same data preprocessing steps, eliminating bugs caused by inconsistent data preprocessing procedures handling training and test data separately. HELIX automatically selects the appropriate data for training and evaluation. However, if desired, users can handle training and test data differently by specifying separate DAGs for training and testing. Common operators can be shared across the two DAGs without code duplication.

3.2.2 Operators

Operators in HELIX are designed to cover the functions enumerated in Section 3.1, using the data structures introduced above. A HELIX operator takes one or more DCs and outputs DCs, ML models, or scalars. Each operator encapsulates a function $f$, written in Scala, to be applied to individual elements in the input DCs. As noted above, $f$ can be learned from the input data or user defined. Like in Scikit-learn, HML provides off-the-shelf implementations for common operations for ease of use. We describe the relationships between operator interfaces in HML and F enumerated in Section 3.1 below.

Scanner.

Scanner is the interface for parsing $\in$ F and acts like a flatMap, i.e., for each input element, it adds zero or more elements to the output DC. Thus, it can also be used to perform filtering. The input and output of Scanner are DCSUs. CSVScanner in Line 4 of FIG. 4, frame a) is an example of a Scanner that parses lines in a CSV file into key-value pairs for columns.

Synthesizer.

Synthesizer supports join $\in$ F, for elements both across multiple DCs and within the same DC. Thus, it can also support aggregation operations such as sliding windows in time series. Synthesizers also serve the important purpose of specifying the set of SUs that make up an example (where output FVs from the SUs are automatically assembled into a single FV). In the simple case where each SU in a DCSU corresponds to an example, a pass-through synthesizer is implicitly declared by naming the output DCE, such as in Line 14 of FIG. 4, frame a).

Learner.

Learner is the interface for learning and inference $\in$ F, in a single operator. A learner operator L contains a learned function $f$ which can be populated by learning from the input data or loading from disk. $f$ can be an ML model, but it can also be a feature transformation function that needs to be learned from the input dataset. When $f$ is empty, L learns a model using input data designated for model training; when $f$ is populated, L performs inference on the input data using $f$ and outputs the inference results into a DCE. For example, the learner incPred in Line 15 of FIG. 4, frame a) is a learner trained on the "train" portion of the DCE income and outputs inference results as the DCE predictions.

Extractor.

Extractor is the interface for feature extraction and feature transformation $\in$ F. Extractor contains the function $f$ applied on the input of SUs, thus the input and output to an extractor are DCSUs. For functions that need to be learned from data, Extractor contains a pointer to the learner operator for learning $f$.

Reducer.

Reducer is the interface for reduce $\epsilon$F and thus the main operator interface for PPR. The inputs to a reducer are DCE and an optional scalar and the output is a scalar, where scalars refer to non-dataset objects. For example, checkResults in FIG. 4, frame a) Line 17 is a reducer that computes the prediction accuracy of the inference results in predictions.

4. Compilation and Representation

In this section, we describe the Workflow DAG, the abstract model used internally by HELIX to represent a Workflow program. The Workflow DAG model enables operator-level change tracking between iterations and end-to-end optimizations.

4.1 The Workflow DAG

At compile time, HELIX's intermediate code generator constructs a Workflow DAG from HML declarations, with nodes corresponding to operator outputs, (DCs, scalars, or ML models), and edges corresponding to input-output relationships between operators.

Definition 1.

For a Workflow W containing HELIX operators F={$f_i$}, the Workflow DAG is a directed acyclic graph $G_W$=(N;E), where node $n_i \in$ N represents the output of $f_i \in$ F and ($n_i$; $n_j$) $\in$ E if the output of $f_i$ is an input to $f_j$.

FIG. 4, frame b) shows the Workflow DAG for the program in FIG. 4, frame a). This transformation is straightforward, creating a node for each declared operator and adding edges between nodes based on the linking expressions, e.g., A results_from B creates an edge (B;A). Additionally, the intermediate code generator introduces edges not specified in the Workflow between the extractor and the synthesizer nodes, such as the edges marked by dots in FIG. 4, frame b). These edges connect extractors to downstream DCs in order to automatically aggregate all features for learning. One concern is that this may lead to redundant computation of unused features; we describe pruning mechanisms to address this issue in Section 5.4.

4.2 Tracking Changes

As described in Section 2.2, a user starts with an initial workflow $W_0$ and iterates on this workflow. Let $W_t$ be the version of the workflow at iteration $t \geq 0$ with the corresponding DAG $G^t_W = (N_t; E_t)$; $W_t+1$ denotes the workflow obtained in the next iteration. To describe the changes between $W_t$ and $W_{t+1}$, we introduce the notion of equivalence.

Definition 2.

A node $n^t_i \in N_t$ is equivalent to $n^{t+1}_i \in N_{t+1}$, denoted as $n^t_i \equiv n^{t+1}_i$, if a) the operators corresponding to $n^t_i$ and $n^{t+1}_i$ compute identical results on the same inputs and b) $n^t_j \equiv n^{t+1}_j \forall n^t_j \in$ parents($n^t_i$), $n^{t+1}_j \in$ parents($n^{t+1}_i$). We say $n^{t+1}_i \in N_{t+1}$ is original if it has no equivalent node in $N_t$.

Equivalence is symmetric, i.e., if $n^{t'}_i \equiv n^t_i$ then $n^t_i \equiv n^{t'}_i$ and vice versa, and transitive, i.e., if $(n^t_i \equiv n^{t'}_i \wedge n^{t'}_i \equiv n^{t''}_i)$ then $n^t_i \equiv n^{t''}_i$. Newly added operators in $W_{t+1}$ do not have equivalent nodes in $W_t$, neither do nodes in $W_t$ that are removed in $W_{t+1}$. For a node that persists across iterations, we need both the operator and the ancestor nodes to stay the same for equivalence. Using this definition of equivalence, we determine if intermediate results on disk can be safely reused through the notion of equivalent materialization:

Definition 3.

A node $n^t_i \in N_t$ has an equivalent materialization if $n^{t'}_i$ is stored on disk, where $t' \leq t$ and $n^{t'}_i \equiv n^t_i$.

One challenge in determining equivalence is deciding whether two versions of an operator compute the same results on the same input. For arbitrary functions, this is undecidable as proven by Rice's Theorem. The programming language community has a large body of work on verifying operational equivalence for specific classes of programs. HELIX currently employs a simple representational equivalence verification—an operator remains equivalent across iterations if its declaration in the DSL is not modified and all of its ancestors are unchanged.

To guarantee correctness, i.e., results obtained at iteration t reflect the specification for $W_t$ and are computed from the appropriate input, we impose the constraint:

Constraint 1.

At iteration t+1, if an operator $n^{t+1}_i$ is original, it must be recomputed.

With Constraint 1, our current approach to tracking changes yields the following guarantee on result correctness:

Theorem 1.

HELIX returns the correct results if the changes between iterations are made only within the programming interface, i.e., all other factors, such as library versions and files on disk, stay invariant, i.e., unchanged, between executions at iteration t and t+1.

Proof.

First, note that the results for $W_0$ are correct since there is no reuse at iteration 0. Suppose for contradiction that given the results at t are correct, the results at iteration t+1 are incorrect, i.e., $\exists n^{t+1}_i$ s.t. the results for $n^t_i$ are reused when $n^{t+1}_i$ is original. Under the invariant conditions in Theorem 1, we can only have $n^{t+1}_i \not\equiv n^t_i$ if the code for $n_i$ changed or the code changed for an ancestor of $n_i$. Since HELIX detects all code changes, it identifies all original operators. Thus, for the results to be incorrect in HELIX, we must have reused $n^t_i$ for some original $n^{t+1}_i$. However, this violates Constraint 1. Therefore, the results for $W_t$ are correct $\forall t \geq 0$.

5. Optimization

In this section, HELIX's workflow-level optimizations are described, motivated by the observation that workflows often share a large amount of intermediate computation between iterations; thus, if certain intermediate results are materialized at iteration t, these can be used at iteration t+1. Two distinct sub-problems have been identified: OPT-EXEC-PLAN, which selects the operators to reuse given previous materializations (Section 5.2), and OPT-MAT-PLAN, which decides what to materialize to accelerate future iterations (Section 5.3). Pruning optimizations are provided to eliminate redundant computations (Section 5.4).

5.1 Preliminaries

When introducing variables below, the iteration number t is dropped from $W_t$ and $G^t_W$ when we are considering a static workflow.

Operator Metrics.

In a Workflow DAG $G_W = (N; E)$, each node $n_i \in N$ corresponding to the output of the operator $f_i$ is associated with a compute time $c_i$, the time it takes to compute $n_i$ from inputs in memory. Once computed, $n_i$ can be materialized on disk and loaded back in subsequent iterations in time $l_i$, referred to as its load time. If $n_i$ does not have an equivalent materialization as defined in Definition 3, we set $l_i = 1$. Root nodes in the Workflow DAG, which correspond to data sources, have $l_i = c_i$.

Operator State.

During the execution of workflow W, each node $n_i$ assumes one of the following states:

Load, or $S_l$, if $n_i$ is loaded from disk;

Compute, or $S_c$, $n_i$ is computed from inputs;

Prune, or $S_p$, if $n_i$ is skipped (neither loaded nor computed).

Let $s(n_i) \in \{S_l, S_c, S_p\}$ denote the state of each $n_i \in N$. To ensure that nodes in the Compute state have their inputs available, i.e., not pruned, the states in a Workflow DAG $G_W = (N; E)$ must satisfy the following execution state constraint:

Constraint 2.

For a node $n_i \in N$, if $s(n_i) = S_c$, then $s(n_j) \neq S_p$ for every $n_j \in$ parents($n_i$).

Workflow Run Time.

A node $n_i$ in state $S_l$, $S_c$, or $S_p$ has run time $c_i$, $l_i$, or 0, respectively. The total run time of W w.r.t. s is thus $$T(W,s) = \Sigma_{n_i \in N} I\{s(n_i) = S_c\} c_i + I\{s(n_i) = S_l\} l_i$$

where I{ } is the indicator function.

Clearly, setting all nodes to $S_p$ trivially minimizes the above equation. However, recall that Constraint 1 requires all original operators to be rerun. Thus, if an original operator $n_i$ is introduced, we must have $s(n_i) = S_c$, which by Constraint 2 requires that $S(n_j) \neq S_p \forall n_j \in$ parents(n). Deciding whether to load or compute the parents can have a cascading effect on the states of their ancestors. We explore how to determine the states for each nodes to minimize the above equation next.

5.2 Optimal Execution Plan

The Optimal Execution Plan (OEP) problem is the core problem solved by HELIX's DAG optimizer, which determines at compile time the optimal execution plan given results and statistics from previous iterations.

Problem 1.

(OPT-EXEC-PLAN) Given a Workflow W with DAG $G_W=(N;E)$, the compute time and the load time $c_i$;$l_i$ for each $n_i \in N$, and a set of previously materialized operators M, find a state assignment s: $N \rightarrow \{S_l, S_c, S_p\}$ that minimizes $T(W;s)$ while satisfying Constraint 1 and Constraint 2.

Let $T^*(W)$ be the minimum execution time achieved by the solution to OEP, i.e., $$T^*(W) = \min_s T(W;s)$$

Since this optimization takes place prior to execution, we must resort to operator statistics from past iterations. This does not compromise accuracy because if a node $n_i$ has an equivalent materialization as defined in Definition 2, we would have run the exact same operator before and recorded accurate $c_i$ and $l_i$. A node $n_i$ without an equivalent materialization, such as a model with changed hyperparameters, needs to be recomputed (Constraint 1).

Figure 5:
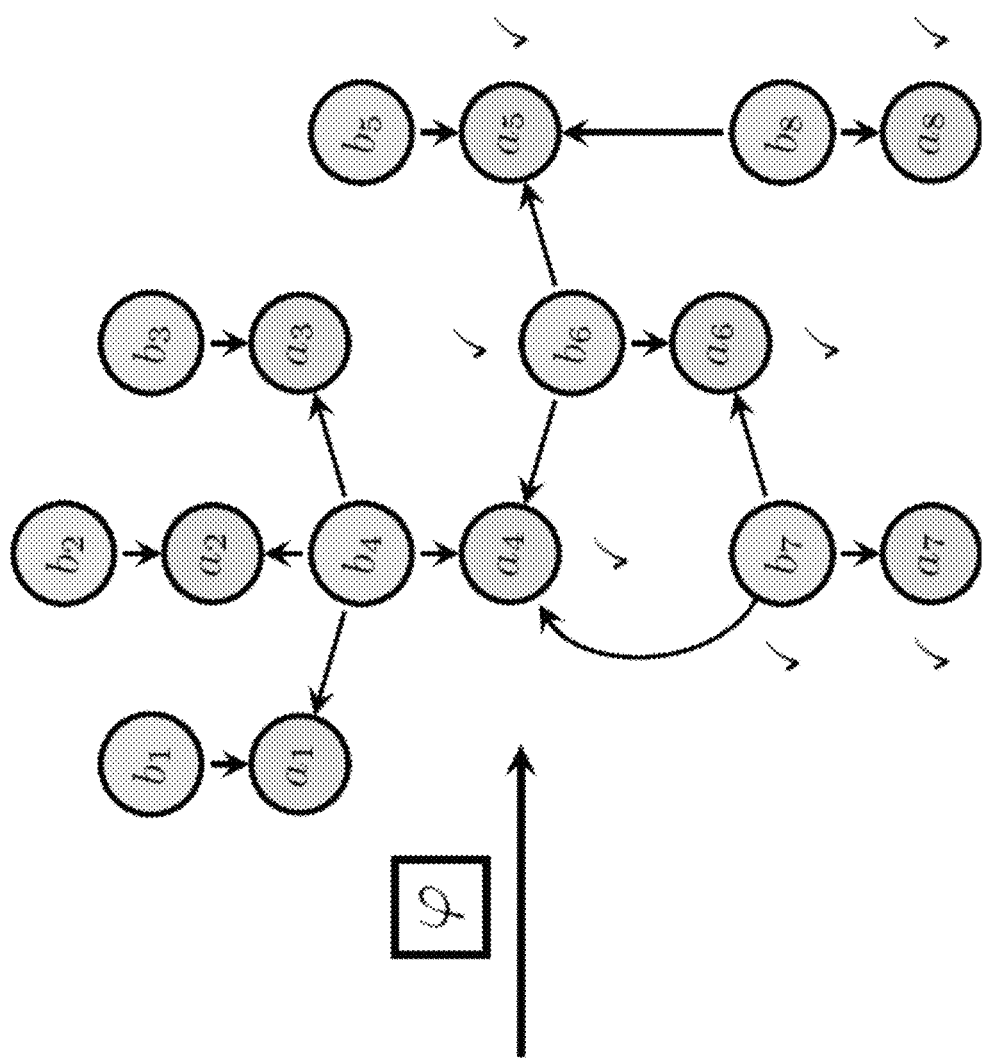
FIG. 5 illustrates steps of an example data processing workflow.
Figure 5:
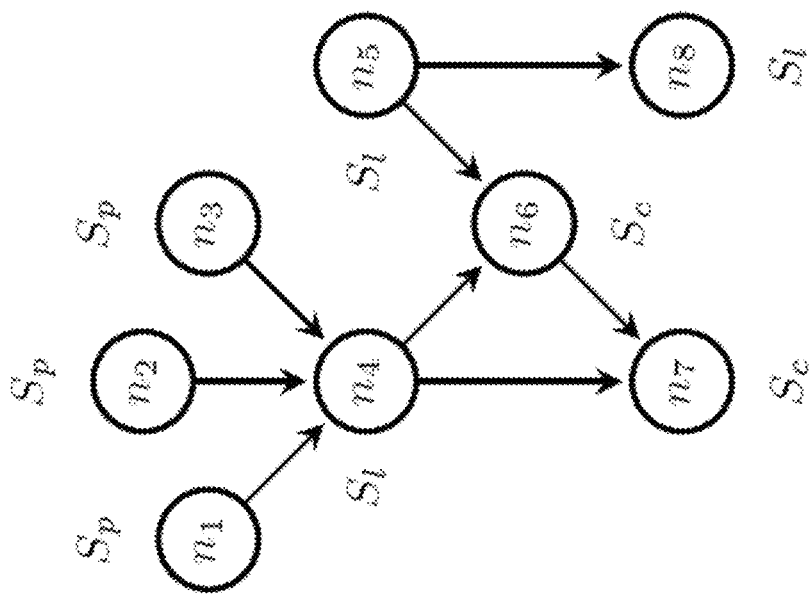

FIG. 5 illustrates the transformation of a Workflow DAG to a set of projects and dependencies. Checkmarks (X) in the RHS DAG indicate a feasible solution to PSP, which maps onto the node states ($S_p$; $S_c$; $S_l$) in the LHS DAG.

Deciding to load certain nodes can have cascading effects since ancestors of a loaded node can potentially be pruned, leading to large reductions in run time. On the other hand, Constraint 2 disallows the parents of computed nodes to be pruned. Thus, the decisions to load a node $n_i$ can be affected by nodes outside of the set of ancestors to $n_i$. For example, in the DAG on the left in FIG. 5, loading $n_7$ allows $n_{1-6}$ to be potentially pruned. However, the decision to compute $n_8$, possibly arising from the fact that $l_8 \gg c_8$, requires that $n_5$ must not be pruned.

Despite such complex dependencies between the decisions for individual nodes, Problem 1 can be solved optimally in polynomial time through a linear time reduction to the project-selection problem (PSP), which is an application of MAX-FLOW.

Problem 2.

PROJ-SELECTION-PROBLEM (PSP) Let P be a set of projects. Each project $i \in P$ has a real-valued profit $p_i$ and a set of prerequisites $Q \subseteq P$. Select a subset $A \subseteq P$ such that all prerequisites of a project $i \in A$ are also in A and the total profit of the selected projects, $\Sigma_{i \in A} p_i$, is maximized.

Reduction to the Project Selection Problem.

We can reduce an instance of Problem 1x to an equivalent instance of PSP y such that the optimal solution to y maps to an optimal solution of x. Let $G=(N;E)$ be the Workflow DAG in x, and P be the set of projects in y. We can visualize the prerequisite requirements in y as a DAG with the projects as the nodes and an edge (j; i) indicating that project i is a prerequisite of project j. The reduction, $\varphi$, depicted in FIG. 5 for an example instance of x, is shown in Algorithm 1. For each node $n_i \in N$, we create two projects in PSP: $a_i$ with profit $-l_i$ and $b_i$ with profit $l_i - c_i$. We set $a_i$ as the prerequisite for $b_i$. For an edge $(n_i; n_j) \in E$, we set the project $a_i$ corresponding to node $n_i$ as the prerequisite for the project $b_j$ corresponding to node $n_j$. Selecting both projects $a_i$ and $b_i$ corresponding to $n_i$ is equivalent to computing $n_i$, i.e., $s(n_i) = S_c$, while selecting only $a_i$ is equivalent to loading $n_i$, i.e., $s(n_i) = S_l$. Nodes with neither projects selected are pruned. An example solution mapping from PSP to OEP is shown in FIG. 5. Projects $a_4$; $a_5$; $a_6$; $b_6$; $a_7$; $b_7$; $a_8$ are selected, which cause nodes $n_4$; $n_5$; $n_8$ to be loaded, $n_6$ and $n_7$ to be computed, and $n_1$; $n_2$; $n_3$ to be pruned.

---

Algorithm 1: OEP via Reduction to PSP

```
    Input G_W = (N;E); {l_i}; {c_i}
1)  P ← ∅;
2)  for n_i ∈ N do
3)      P ← P ∪ {a_i} ; // Create a project a_i
4)      profit[a_i] ← -l_i; // Set profit of a_i to -l_i
5)      P ← P ∪ {b_i} ; // Create a project b_i
6)      profit[b_i] ← l_i - C_i ; // Set profit of b_i to l_i - c_i
        // Add a_i as prerequisite for b_i;
7)      prerequisite[b_i] prerequisite[b_i] ∪ a_i;
8)      for (n_i; n_j) ∈ {edges leaving from n_i} ⊆ E do
            // Add a_i as prerequisite for b_j;
9)          prerequisite[b_j] prerequisite[b_j] ∪ a_i;
    // A is the set of projects selected by PSP;
10) A ← PSP(P, profit[ ], prerequisite[ ]);
11) for n_i ∈ N do // Map PSP solution to node states
12)     if a_i ∈ A and b_i ∈ A then
13)         s[n_i] ← S_c;
14)     else if a_i ∈ A and b_i ∉ A then
15)         s[n_i] ← S_l;
16)     else
17)         s[n_i] ← S_p;
18) return s[ ] ; // State assignments for nodes in G_W.
```

Overall, the optimization objective in PSP models the "savings" in OEP incurred by loading nodes instead of computing them from inputs. We create an equivalence between cost minimization in OEP and profit maximization in PSP by mapping the costs in OEP to negative profits in PSP. For a node $n_i$, picking only project $a_i$ (equivalent to loading $n_i$) has a profit of $-l_i$, whereas picking both $a_i$ and $b_i$ (equivalent to computing $n_i$) has a profit of $-l_i + (l_i - c_i) = -c_i$. Establishing a prerequisite that requires $a_i$ to also be picked if $b_i$ is picked are to ensure correct cost to profit mapping. For a project $b_i$ to be picked, we must pick every $a_j$ corresponding to each parent $n_j$ of $n_i$. If it is impossible ($l_j=1$) or costly to load $n_j$, we can offset the load cost by picking $b_j$ for computing $n_j$. However, computing $n_j$ also requires its parents to be loaded or computed, as modeled by the outgoing edges from $b_j$. The fact that $a_i$ projects have no outgoing edges corresponds to the fact loading a node removes its dependency on all ancestor nodes.

Theorem 2.

Given an instance of OPT-EXEC-PLAN x, the reduction in Algorithm 1 produces a feasible and optimal solution to x.

Computational Complexity.

For a Workflow DAG $G_W=(N_W; E_W)$ in OEP, the reduction above results in $O(|N_W|)$ projects and $O(|E_W|)$ prerequisite edges in PSP. PSP has a straightforward linear reduction to MAX-FLOW. The Edmonds-Karp algorithm was used for MAX-FLOW, which runs in time $O(|N_W| \cdot |E_W|^2)$.

Impact of Change Detection Precision and Recall.

The optimality of the above algorithm for OEP assumes that the changes between iteration t and t+1 have been identified perfectly. In reality, this maybe not be the case due to the intractability of change detection, as discussed in Section 4.2. An undetected change is a false negative in this case, while falsely identifying an unchanged operator as deprecated is a false positive. A detection mechanism with high precision lowers the chance of unnecessary recomputation, whereas anything lower than perfect recall leads to incorrect results. In the current approach, a detection mechanism that can guarantee correctness under mild assumptions was selected, at the cost of some false positives such as $a+b \equiv b+a$.

5.3 Optimal Materialization Plan

The OPT-MAT-PLAN (OMP) problem is tackled by HELIX's materialization optimizer: while running workflow $W_t$ at iteration t, intermediate results are selectively materialized for the purpose of accelerating execution in iterations>t. We now formally introduce OMP and show that it is NP-HARD even under strong assumptions. We propose an online heuristic for OMP that runs in linear time and achieves good reuse rate in practice (as we will show in Section 6), in addition to minimizing memory footprint by avoiding unnecessary caching of intermediate results.

Materialization Cost.

We let $s_i$ denote the storage cost for materializing $n_i$, representing the size of $n_i$ on disk. When loading $n_i$ back from disk to memory, we have the following relationship between load time and storage cost: $l_i=s_i$/(disk read speed). For simplicity, we also assume the time to write $n_i$ to disk is the same as the time for loading it from disk, i.e., $l_i$. We can easily generalize to the setting where load and write latencies are different.

To quantify the benefit of materializing intermediate results at iteration t on subsequent iterations, we formulate the materialization run time $T_M(W_t)$ to capture the tradeoff between the additional time to materialize intermediate results and the run time reduction in iteration t+1. Although materialized results can be reused in multiple future iterations, we only consider the (t+1)th iteration since the total number of future iterations, T, is unknown. Since modeling T is a complex open problem, we defer the amortization model to future work.

Definition 4.

Given a workflow $W_t$, operator metrics $c_i$; $l_i$; $s_i$ for every $n_i \in N_t$, and a subset of nodes $M \subseteq N_t$, the materialization run time is defined as $$T_M(W_T) = \Sigma_{n_i \in M} l_i + T^*(W_{t+1})$$

Where $\Sigma_{n_i \in M} l_i$ is the time to materialize all nodes selected for materialization, and $T^*(W_{t+1})$ is the optimal workflow run time obtained using the algorithm in Section 5.2, with M materialized. The above equation defines the optimization objective for OMP.

Problem 3.

(OPT-MAT-PLAN) Given a Workflow $W_t$ with DAG $G^t_W = (N_t; E_t)$ at iteration t and a storage budget S, find a subset of nodes $M \subseteq N_t$ to materialize at t in order to minimize $T_M(W_t)$, while satisfying the storage constraint $\Sigma_{n_i \in M} s_i \leq S$.

Let M* be the optimal solution to OMP, i.e., $$\text{argmin}_{M \subseteq N_t} \Sigma_{n_i \in M} l_i + T^*(W_{t+1})$$

There are many possibilities for $W_{t+1}$, and they vary by application domain. User modeling and predictive analysis of $W_{t+1}$ itself is a substantial research topic. This user model can be incorporated into OMP by using the predicted changes to better estimate the likelihood of reuse for each operator. However, even under very restrictive assumptions about $W_{t+1}$, we can show that OPT-MAT-PLAN is NP-HARD, via a simple reduction from the KNAPSACK problem.

Theorem 3.

OPT-MAT-PLAN is NP-hard.

Streaming Constraint.

Even when $W_{t\pm 1}$ is known, solving OPT-MAT-PLAN optimally requires knowing the run time statistics for all operators, which can be fully obtained only at the end of the workflow. Deferring materialization decisions until the end requires all intermediate results to be cached or recomputed, which imposes undue pressure on memory and cripples performance. Unfortunately, reusing statistics from past iterations as in Section 5.2 is not viable here because of the cold-start problem—materialization decisions need to be made for new operators based on realistic statistics. Thus, to avoid slowing down execution with high memory usage, we impose the following constraint.

| Algorithm 2: Streaming OMP |
|---|
| Data: $G_w = (N;E)$, $\{l_i\}$, $\{c_i\}$, $\{s_i\}$, storage budget S |
| 1)      $M \leftarrow \emptyset$; |
| 2)      while Workflow is running do |
| 3)          $O \leftarrow$ FindOutOfScope(N); |
| 4)          for $n_i \in O$ do |
| 5)              if $C(n_i) > 2l_i$ and $S - s_i \geq 0$ then |
| 6)                  Materialize $n_i$; |
| 7)                  $M \leftarrow M \cup \{n_i\}$; |
| 8)                  $S \leftarrow S - s_i$ |

Definition 5.

Given a Workflow DAG $g_w = (N;E)$, $n_i \in N$ is out-of-scope at runtime if all children of $n_i$ have been computed or reloaded from disk, thus removing all dependencies on $n_i$.

Constraint 3.

Once $n_i$ becomes out-of-scope, it is either materialized immediately or removed from cache.

OMP Heuristics.

We now describe the heuristic employed by HELIX to approximate OMP while satisfying Constraint 3.

Definition 6.

Given Workflow DAG $G_W = (N;E)$, the cumulative run time for a node $n_i$ is defined as $$C(n_i) = t(n_i) + \Sigma_{n_j \in \text{ancestors}(n_i)} t(n_j)$$

where $t(n_i) = I\{s(n) = S_c\}c_i + I\{s(n_i) = S_l\}l_i$.

Algorithm 2 shows the heuristics employed by HELIX's materialization optimizer to decide what intermediate results to materialize. In essence, Algorithm 2 decides to materialize if twice the load cost is less than the cumulative run time for a node. The intuition behind this algorithm is that assuming loading a node allows all of its ancestors to be pruned, the materialization time in iteration t and the load time in iteration t+1 combined should be less than the total pruned compute time, for the materialization to be cost effective.

Note that the decision to materialize does not depend on which ancestor nodes have been previously materialized. The advantage of this approach is that regardless of where in the workflow the changes are made, the reusable portions leading up to the changes are likely to have an efficient execution plan. That is to say, if it is cheaper to load a reusable node $n_i$ than to recompute, Algorithm 2 would have materialized $n_i$ previously, allowing us to make the right choice for $n_i$. Otherwise, Algorithm 2 would have materialized some ancestor $n_j$ of $n_i$ such that loading $n_j$ and computing everything leading to $n_i$ is still cheaper than loading $n_i$.

Due to the streaming Constraint 3, complex dependencies between descendants of ancestors such as the one between $n_5$ and $n_8$ in FIG. 5 previously described in Section 5.2, are ignored by Algorithm 2—we cannot retroactively update our decision for $n_5$ after $n_8$ has been run. We show in Section 6 that this simple algorithm is effective in multiple application domains.

Limitations of Streaming OMP.

The streaming OMP heuristic given in Algorithm 2 can behave poorly in pathological cases. For one simple example, consider a workflow given by a chain DAG of m nodes, where node $n_i$ (starting from i=1) is a prerequisite for node $n_i+1$. If node $n_i$ has $l_i=i$ and $c_i=3$, for all i, then Algorithm 2 will choose to materialize every node, which has storage costs of $O(m^2)$, whereas a smarter approach would only materialize later nodes and perhaps have storage cost $O(m)$. If storage is exhausted because Algorithm 2 persists too much early on, this could easily lead to poor execution times in later iterations. We did not observe this sort of pathological behavior in our experiments.

Mini-Batches.

In the stream processing (to be distinguished from the streaming constraint in Constraint 3) where the input is divided into mini batches processed end-to-end independently, Algorithm 2 can be adapted as follows: 1) make materialization decisions using the load and compute time for the first mini batch processed end-to-end; 2) reuse the same decisions for all subsequent mini batches for each operator. This approach avoids dataset fragmentation that complicates reuse for different workflow versions.

5.4 Workflow DAG Pruning

In addition to optimizations involving intermediate result reuse, HELIX further reduces overall workflow execution time by time by pruning extraneous operators from the Workflow DAG.

HELIX performs pruning by applying program slicing on the Workflow DAG. In a nutshell, HELIX traverses the DAG backwards from the output nodes and prunes away any nodes not visited in this traversal. Users can explicitly guide this process in the programming interface through the has_extractors and uses keywords. An example of an Extractor pruned in this fashion is raceExt(grayed out) in FIG. 4(b), as it is excluded from the rows has_extractors statement. This allows users to conveniently perform manual feature selection using domain knowledge.

HELIX provides two additional mechanisms for pruning operators other than using the lack of output dependency, described next.

Data-Driven Pruning.

Furthermore, HELIX inspects relevant data to automatically identify operators to prune. The key challenge in data-driven pruning is data lineage tracking across the entire workflow. For many existing systems, it is difficult to trace features in the learned model back to the operators that produced them. To overcome this limitation, HELIX performs additional provenance bookkeeping to track the operators that led to each feature in the model when converting DPR output to ML-compatible formats. An example of data-driven workflow optimization enabled by this bookkeeping is pruning features by model weights. Operators resulting in features with zero weights can be pruned without changing the prediction outcome, thus lowering the overall run time without compromising model performance.

Data-driven pruning is a powerful technique that can be extended to unlock the possibilities for many more impactful automatic workflow optimizations. Possible future work includes using this technique to minimize online inference time in large scale, high query-per-second settings and to adapt the workflow online in stream processing.

Cache Pruning.

While Spark, the underlying data processing engine for HELIX, provides automatic data uncaching via a least-recently-used (LRU) scheme, HELIX improves upon the performance by actively managing the set of data to evict from cache. From the DAG, HELIX can detect when a node becomes out-of-scope. Once an operator has finished running, HELIX analyzes the DAG to uncache newly out-of-scope nodes. Combined with the lazy evaluation order, the intermediate results for an operator reside in cache only when it is immediately needed for a dependent operator.

One limitation of this eager eviction scheme is that any dependencies undetected by HELIX, such as the ones created in a UDF, can lead to premature uncaching of DCs before they are truly out-of-scope. The uses keyword in HML provides a mechanism for users to manually prevent this by explicitly declaring a UDF's dependencies on other operators. Automatic UDF dependency detection can be performed via introspection.

6. Empirical Evaluation

The goal of these evaluations is to test if HELIX 1) supports ML workflows in a variety of application domains; 2) accelerates iterative execution through intermediate result reuse, compared to other ML systems that don't optimize iteration; 3) is efficient, enabling optimal reuse without incurring a large storage overhead.

6.1 Systems and Baselines for Comparison

The optimized version of HELIX, HELIX OPT, was compared against two state-of-the-art ML workflow systems: KeystoneML, and DeepDive. In addition, HELIX OPT was compared with two simpler versions, HELIX AM and HELIX NM. While comparisons were performed against DeepDive, and KeystoneML to verify 1) and 2) above, HELIX AM and HELIX NM are used to verify 3). Each of these variants is described below:

KeystoneML.

KeystoneML is a system, written in Scala and built on top of Spark, for the construction of large scale, end-to-end, ML pipelines. KeystoneML specializes in classification tasks on structured input data. No intermediate results are materialized in KeystoneML, as it does not optimize execution across iterations.

DeepDive.

DeepDive is a system, written using Bash scripts and Scala for the main engine, with a database backend, for the construction of end-to-end information extraction pipelines. Additionally, DeepDive provides limited support for classification tasks. All intermediate results are materialized in DeepDive.

HELIX OPT.

A version of HELIX that uses Algorithm 1 for the optimal reuse strategy and Algorithm 2 to decide what to materialize.

HELIX AM.

A version of HELIX that uses the same reuse strategy as HELIX OPT and always materializes all intermediate results.

HELIX NM.

A version of HELIX that uses the same reuse strategy as HELIX OPT and never materializes any intermediate results.

6.2 Workflows

These experiments were conducted using four real-world ML workflows spanning a range of application domains. Four properties were assessed when characterizing each workflow:

Number of data sources: whether the input data comes from a single source (e.g., a CSV file) or multiple sources (e.g., documents and a knowledge base), necessitating joins.

Input to example mapping: the mapping from each input data unit (e.g., a line in a file) to each learning example for ML. One-to-many mappings require more complex data preprocessing than one-to-one mappings.

Feature granularity: fine-grained features involve applying extraction logic on a specific piece of the data (e.g., 2nd column) and are often application-specific, whereas coarse-grained features are obtained by applying an operation, usually a standard DPR technique such as normalization, on the entire dataset.

Learning task type: while classification and structured prediction tasks both fall under supervised learning for having observed labels, structured prediction workflows involve more complex data preprocessing and models; unsupervised learning tasks do not have known labels, so they often require more qualitative and fine-grained analyses of outputs.

Census Workflow.

This workflow corresponds to a classification task with simple features from structured inputs from the DeepDive Github repository. It uses the Census Income dataset, with 14 attributes representing demographic information, with the goal to predict whether a person's annual income is >50K, using fine-grained features derived from input attributes. The complexity of this workflow is representative of use cases in the social and natural sciences, where covariate analysis is conducted on well-defined variables HELIX code for the initial version of this workflow is shown in FIG. 4(a). This workflow evaluates a system's efficiency in handling simple ML tasks with fine-grained feature engineering.

Genomics Workflow.

This workflow is described in Example 1, involving two major steps: 1) split the input articles into words and learn vector representations for entities of interest, identified by joining with a genomic knowledge base, using word2vec; 2) cluster the vector representation of genes using K-Means to identify functional similarity. Each input record is an article, and it maps onto many gene names, which are training examples. This workflow has minimal data preprocessing with no specific features but involves multiple learning steps. Both learning steps are unsupervised, which leads to more qualitative and exploratory evaluations of the model outputs than the standard metrics used for supervised learning. We include a workflow with unsupervised learning and multiple learning steps to verify that the system is able to accommodate variability in the learning task.

Information Extraction (IE) Workflow.

This workflow involves identifying mentions of spouse pairs from news articles, using a knowledge-base of known spouse pairs, from DeepDive. The objective is to extract structured information from unstructured input text, using complex fine-grained features such as part-of-speech tagging. Each input article contains ≥0 spouse pairs, hence creating a one-to-many relationship between input records and learning examples. This workflow exemplifies use cases in information extraction, and tests a system's ability to handle joins and complex data preprocessing.

MNIST Workflow.

The MNIST dataset contains images of handwritten digits to be classified, which is a well-studied task in the computer vision community, from the KeystoneML evaluation. The workflow involves nondeterministic (and hence not reusable) data preprocessing, with a substantial fraction of the overall run time spent on L/I in a typical iteration. We include this application to ensure that in the extreme case where there is little reuse across iterations, HELIX does not incur a large overhead.

Each workflow was implemented in HELIX, and if supported, in DeepDive and KeystoneML.

DeepDive has its own DSL, while KeystoneML's programming interface is an embedded DSL in Scala, similar to HML. We explain limitations that prevent DeepDive and KeystoneML from supporting certain workflows in Section 6.5.1.

6.3 Running Experiments

Simulating Iterative Development.

In our experiments, we modify the workflows to simulate typical iterative development by a ML application developer or data scientist. Instead of arbitrarily choosing operators to modify in each iteration, we use the iteration frequency in FIG. 4 from our literature study to determine the type of modifications to make in each iteration, for the specific domain of each workflow. We convert the iteration counts into fractions that represent the likelihood of a certain type of change. At each iteration, we draw an iteration type from {DPR, L/I, PPR} according to these likelihoods. Then, we randomly choose an operator of the drawn type and modify its source code. For example, if an "L/I" iteration were drawn, we might change the regularization parameter for the ML model. We run 10 iterations per workflow (except NLP, which has only DPR iterations), double the average iteration count found in our survey.

Note that in real world use, the modifications in each iteration are entirely up to the user. HELIX is not designed to suggest modifications, and the modifications chosen in our experiments are for evaluating only system run time and storage use. We use statistics aggregated over >100 papers to determine the iterative modifications in order to simulate behaviors of the average domain expert more realistically than arbitrary choice.

Environment. All single-node experiments are run on a server with 125 GiB of RAM, 16 cores on 8 CPUs (Intel Xeon@2.40 GHz), and 2 TB HDD with 170 MB/s as both the read and write speeds. Distributed experiments are run on nodes each with 64 GB of RAM, 16 cores on 8 CPUs (Intel Xeon @ 2.40 GHz), and 500 GB of HDD with 180 MB/s as both the read and write speeds. We set the storage budget in HELIX to 10 GB. That is, 10 GB is the maximum accumulated disk storage for HELIX OPT at all times during the experiments. After running the initial version to obtain the run time for iteration 0, a workflow is modified according to the type of change determined as above. In all four systems the modified workflow is recompiled. In DeepDive, we rerun the workflow using the command deepdive run. In HELIX and KeystoneML, we resubmit a job to Spark in local mode. We use Postgres as the database backend for DeepDive. Although HELIX and KeystoneML support distributed execution via Spark, DeepDive needs to run on a single server. Thus, we compare against all systems on a single node and additionally compare against KeystoneML on clusters.

6.4 Metrics

We evaluate each system's ability to support diverse ML tasks by qualitative characterization of the workflows and use-cases supported by each system. Our primary metric for workflow execution is cumulative run time over multiple iterations. The cumulative run time considers only the run time of the workflows, not any human development time. We measure with wall-clock time because it is the latency experienced by the user. When computing cumulative run times, we average the per-iteration run times over five complete runs for stability. Note that the per-iteration time measures both the time to execute the workflow and any time spent to materialize intermediate results. We also measure memory usage to analyze the effect of batch processing, and measure storage size to compare the run time reduction to storage ratio of time-efficient approaches. Storage is compared only for variants of HELIX since other systems do not support automatic reuse.

6.5 Evaluation Vs. State-of-the-Art Systems 6.5.1 Use Case Support

Figure 6:
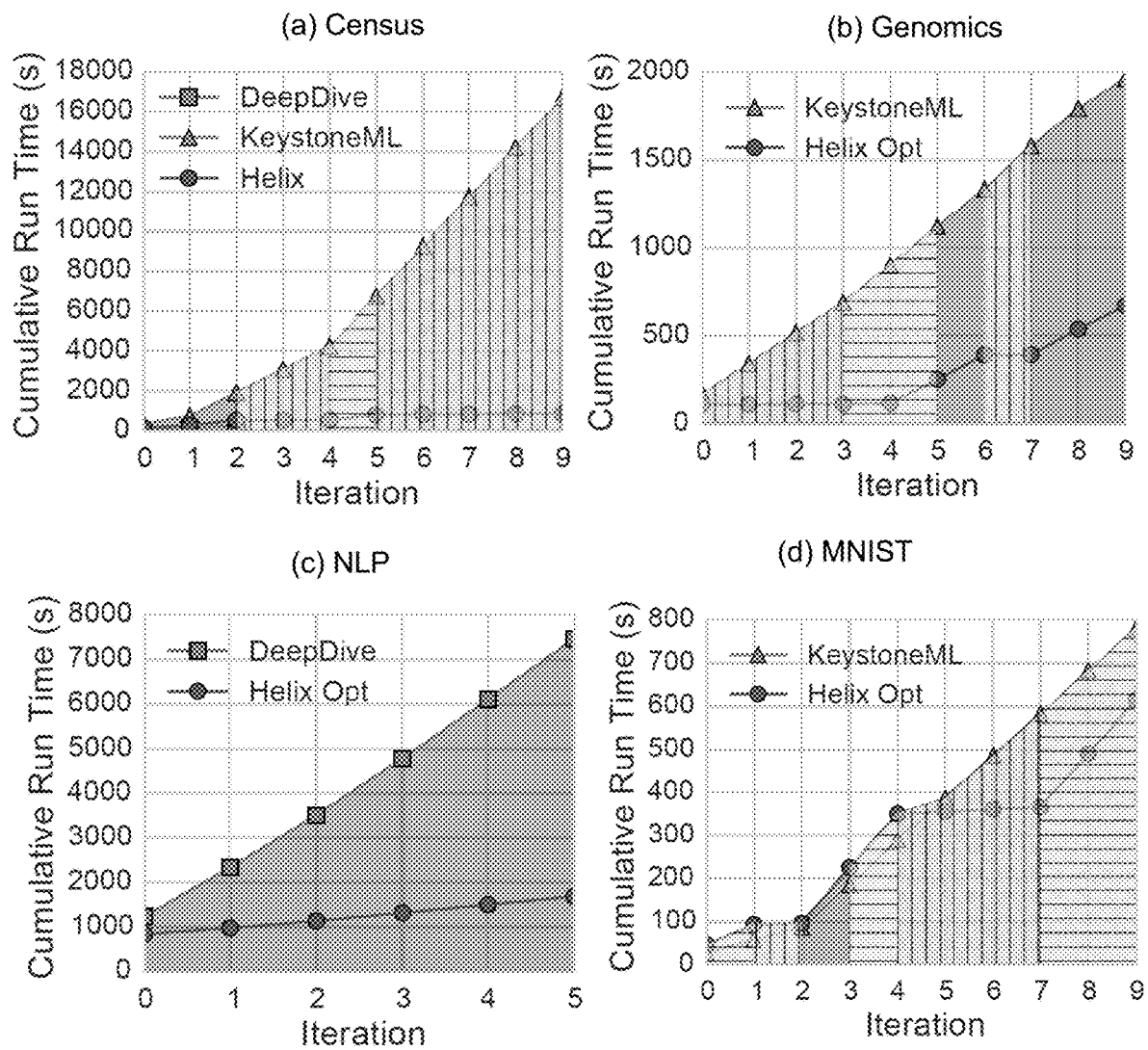
FIG. 6 illustrates results of assessment of the embodiments described herein.

FIG. 6 illustrates cumulative run time for the four workflows. The pattern under the curve indicates the type of change in each iteration: no pattern for DPR, horizontal lines for L/I, and vertical lines for PPR.

HELIX supports ML workflows in multiple distinct application domains, spanning tasks with varying complexity in both supervised and unsupervised learning.

Recall that the four workflows used in our experiments are in social sciences, NLP, computer vision, and natural sciences, respectively. Both KeystoneML and Deep-Dive have limitations that prevent them from supporting certain types of tasks. The pipeline programming model in KeystoneML is effective for large scale classification and can be adapted to support unsupervised learning. However, it makes fine-grained features cumbersome to program and is not conducive to structured prediction tasks due to complex data preprocessing. On the other hand, DeepDive is highly specialized for information extraction and focuses on supporting data preprocessing. Unfortunately, its learning and evaluation components are not configurable by the user, limiting the type of ML tasks supported. DeepDive is therefore unable to support the MNIST and genomics workflows, both of which required custom ML models. Additionally, we are only able to show DeepDive performance for DPR iterations for the supported workflows in our experiments.

6.5.2 Cumulative Run Time

HELIX achieves up to 19× cumulative run time reduction in ten iterations over state-of-the-art ML systems.

Figure 7:
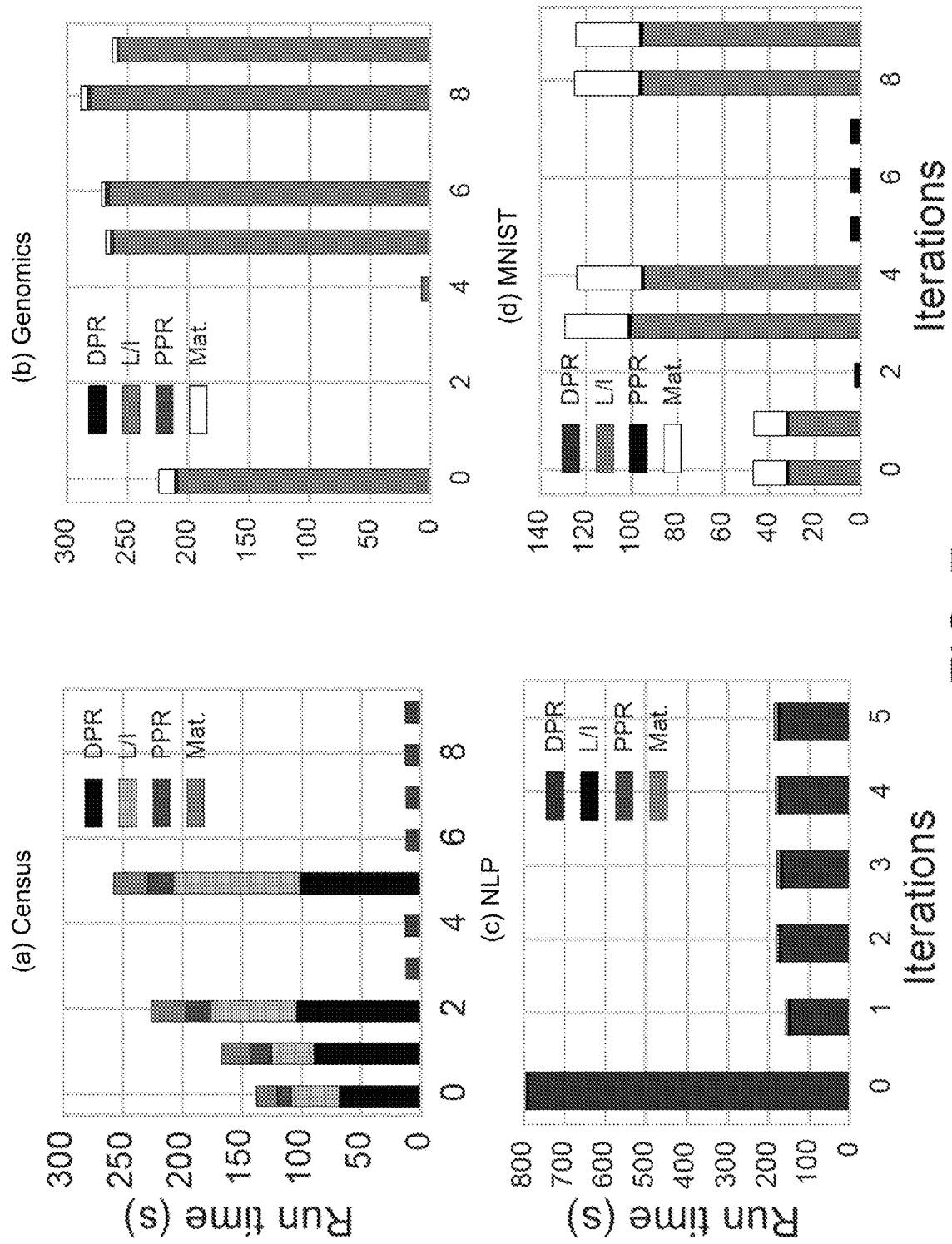
FIG. 7 illustrates results of assessment of the embodiments described herein.

FIG. 7 shows the cumulative run time and materialization time per iteration for all four workflows.

The x-axis shows the iteration number, while the y-axis shows the cumulative run time in log scale at the ith iteration. Each point represents the cumulative run time of the first i iterations. The texture under the curve indicates the workflow component modified in each iteration (no texture=DPR, horizontal lines=L/I, vertical lines=PPR). For example, the DPR component was modified in the first iteration of Census. FIG. 7 shows the breakdown by workflow components and materialization for the individual iteration run times in HELIX.

Census.

As shown in FIG. 6(a), the census workflow has the largest cumulative run time gap between HELIX OPT and the competitor systems—HELIX OPT is 19× faster than KeystoneML as measured by cumulative run time over 10 iterations. By materializing and reusing intermediate results HELIX OPT is able to substantially reduce cumulative run-time relative to other systems. FIG. 7(a) shows that 1) on PPR iterations HELIX recomputes only the PPR; 2) the materialization of L/I outputs, which allows the pruning of DPR and LIT in PPR iterations, takes considerably less time than the compute time for DPR and LIT; 3) HELIX OPT reruns DPR in iteration 5 (L/I) because HELIX OPT avoided materializing the large DPR output in a previous iteration. For the first three iterations, which are DPR (the only type of iterations DeepDive supports), the 2× reduction between HELIX OPT and DeepDive is due to the fact that DeepDive does data preprocessing with Python and shell scripts, while HELIX OPT uses Spark. While both KeystoneML and HELIX OPT use Spark, KeystoneML takes longer on DPR and L/I iterations than HELIX OPT due to a longer L/I time incurred by its caching optimizer's failing to cache the training data for learning. The dominant number of PPR iterations for this workflow reflects the fact that users in the social sciences conduct extensive fine-grained analysis of results, per our literature survey.

Genomics. In FIG. 6(b), HELIX OPT shows a 3× speedup over KeystoneML for the genomics workflow. The materialize-nothing strategy in KeystoneML clearly leads to no run time reduction in subsequent iterations HELIX OPT, on the other hand, shows a periteration run time that is proportional to the number of operators affected by the change in that iteration. FIG. 7(b) shows that 1) in PPR iterations HELIX OPT has near-zero run time, enabled by a small materialization time in the prior iteration; 2) one of the ML models takes considerably more time, and HELIX OPT is able to prune it in iteration 4 since it is not changed.

NLP.

FIG. 6(c) shows that the cumulative run time for both Deep-Dive and HELIX OPT increases linearly with iteration for the NLP workflow, but at a much higher rate for DeepDive than HELIX OPT. This is due to the lack of automatic reuse in DeepDive. The first operator in this workflow is a time-consuming NLP parsing operator, whose results are reusable for all subsequent iterations. While both DeepDive and HELIX OPT materialize this operator in the first iteration, DeepDive does not automatically reuse the results. HELIX OPT, on the other hand, consistently prunes this NLP operation in all subsequent iterations, as shown in FIG. 7(c), leading to large run time reductions in iterations 1-5 and thus a large cumulative run time reduction.

MNIST.

FIG. 6(d) shows the cumulative run times for the MNIST workflow. As mentioned above, the MNIST workflow has nondeterministic data preprocessing, which means any changes to the DPR and L/I components prevents safe reuse of any intermediate result. However, iterations containing only PPR changes can reuse intermediates for DPR and L/I had they been materialized previously. Furthermore, we found that the DPR run time is short but cumulative size of all DPR intermediates is large. Thus, materializing all these DPR intermediates would incur a large run time overhead. KeystoneML, which does not materialize any intermediate results, shows a linear increase in cumulative run time due to no reuse HELIX OPT, on the other hand, only shows slight increase in runtime over KeystoneML for DPR and L/I iterations because it is only materializing the L/I results on these iterations, not the nonreusable, large DPR intermediates. In FIG. 7(d), we see 1) DPR operations take negligible time, and HELIX OPT avoids wasteful materialization of their outputs; 2) the materialization time taken in the DPR and LIT iterations pays off for HELIX OPT in PPR iterations, which take negligible run time due to reuse.

6.5.3 Scalability vs. KeystoneML

Figure 8:
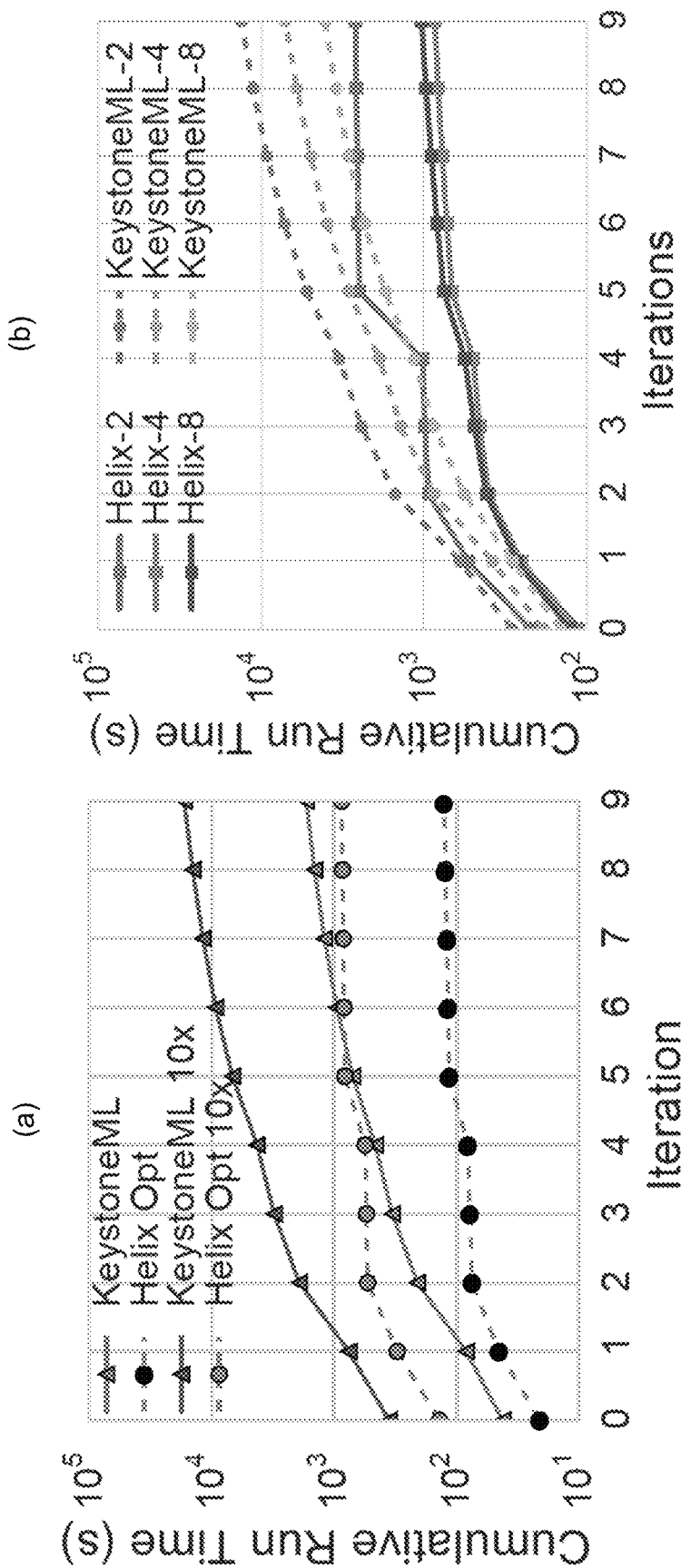
FIG. 8 illustrates results of assessment of the embodiments described herein.

FIG. 8 frame (a) illustrates Census and Census 10× cumulative run time for HELIX and KeystoneML on a single node; frame (b) shows Census 10× cumulative run time for HELIX and KeystoneML on different size clusters.

Dataset Size.

We test scalability of HELIX and KeystoneML with respect to dataset size by running the ten iterations in FIG. 6(a) of the Census Workflow on two different sizes of the input. Census 10× is obtained by replicating Census ten times in order to preserve the learning objective. FIG. 8(a) shows run time performance of HELIX and KeystoneML on the two datasets on a single node. Both yield 10× speedup over the smaller dataset, scaling linearly with input data size, but HELIX continues to dominate KeystoneML.

Cluster.

We test scalability of HELIX and KeystoneML with respect to cluster size by running the same ten iterations in FIG. 6(a) on Census 10× described above. Using a uniform set of machines, we create clusters with 2, 4, and 8 workers and run HELIX and KeystoneML on each of these clusters to collect cumulative run time.

FIG. 8(b) shows that 1) HELIX has lower cumulative run time than KeystoneML on the same cluster size, consistent with the single node results; 2) KeystoneML achieves ~45% run time reduction when the number of workers is doubled, scaling roughly linearly with the number of workers; 3) From 2 to 4 workers, HELIX achieves up to 75% run time reduction 4) From 4 to 8 workers, HELIX sees a slight increase in run time. Recall from Section 3 that the semantic unit data structure in HML allows multiple transformer operations (e.g., indexing, computing discretization boundaries) to be learned using a single pass over the data via loop fusion. This reduces the communication overhead in the cluster setting, hence the super linear speedup in 3). On the other hand, the communication overhead for PPR operations outweighs the benefits of distributed computing, hence the slight increase in 4).

Figure 9:
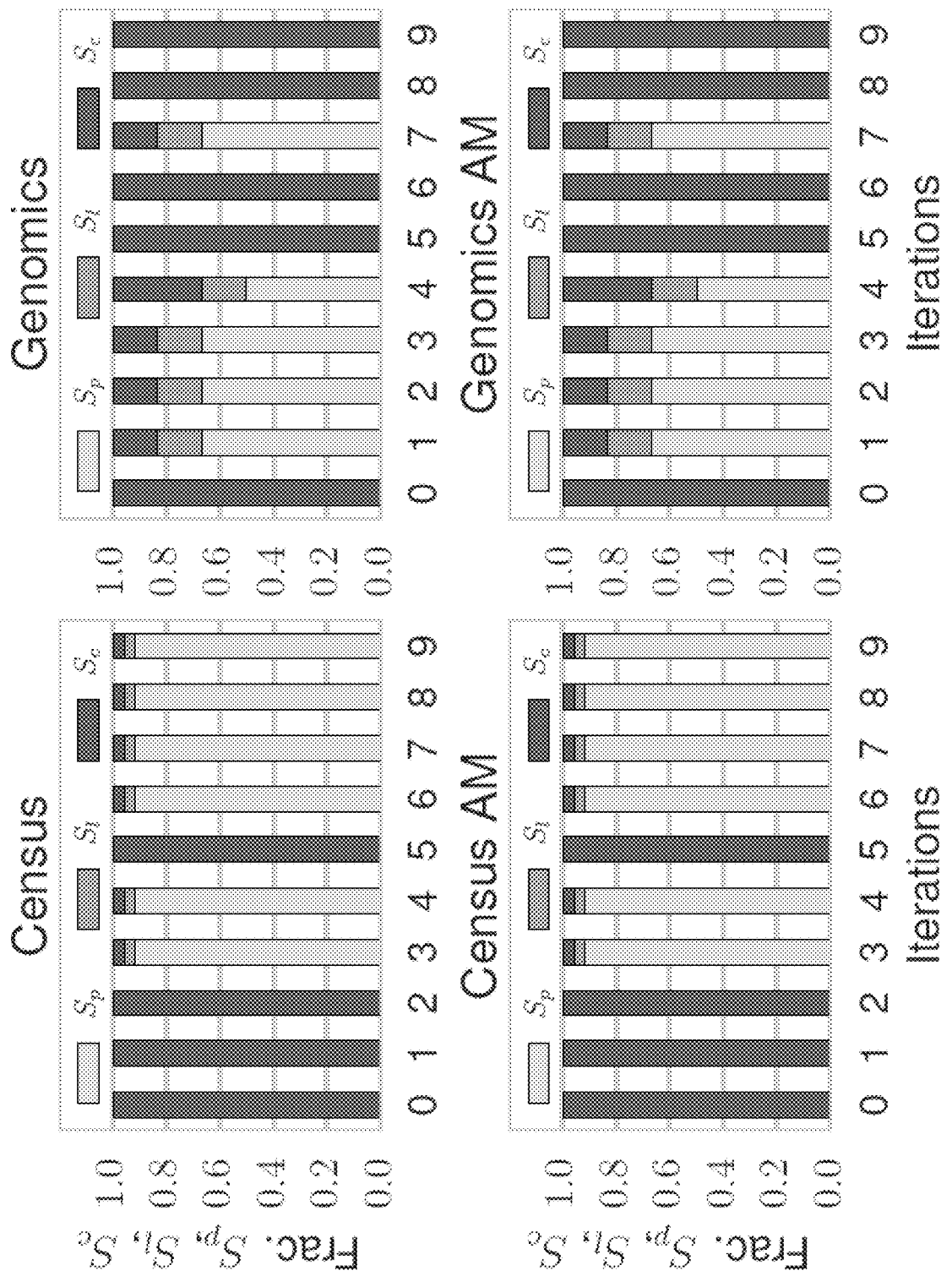
FIG. 9 illustrates results of assessment of the embodiments described herein.

FIG. 9 shows the fraction of states in $S_p$; $S_i$; $S_c$ as determined by Algorithm 1 for the Census and Genomics workflows for HELIX OPT and HELIX AM.

6.6 Evaluation vs. Simpler HELIX Versions

HELIX OPT achieves the lowest cumulative run time on all workflows compared to simpler versions of HELIX. HELIX AM often uses more than 30× the storage of HELIX OPT when able to complete in a reasonable time, while not being able to complete within 50× of the time taken by HELIX OPT elsewhere. HELIX NM takes up to 4× the time taken by HELIX OPT.

The effectiveness of Algorithm 2 at approximating the solution to the NP-hard OPT-MAT-PLAN problem was evaluated. HELIX OPT that runs Algorithm 2 was compared against: HELIX AM that replaces Algorithm 2 with the policy to always materialize every operator, and HELIX NM that never materializes any operator. The two baseline heuristics present two performance extremes: HELIX AM maximizes storage usage, time for materialization, and the likelihood of being able to reuse unchanged results, whereas HELIX NM minimizes all three quantities. HELIX AM provides the most flexible choices for reuse. On the other hand, HELIX NM has no materialization time overhead but also offers no reuse.

Figure 10:
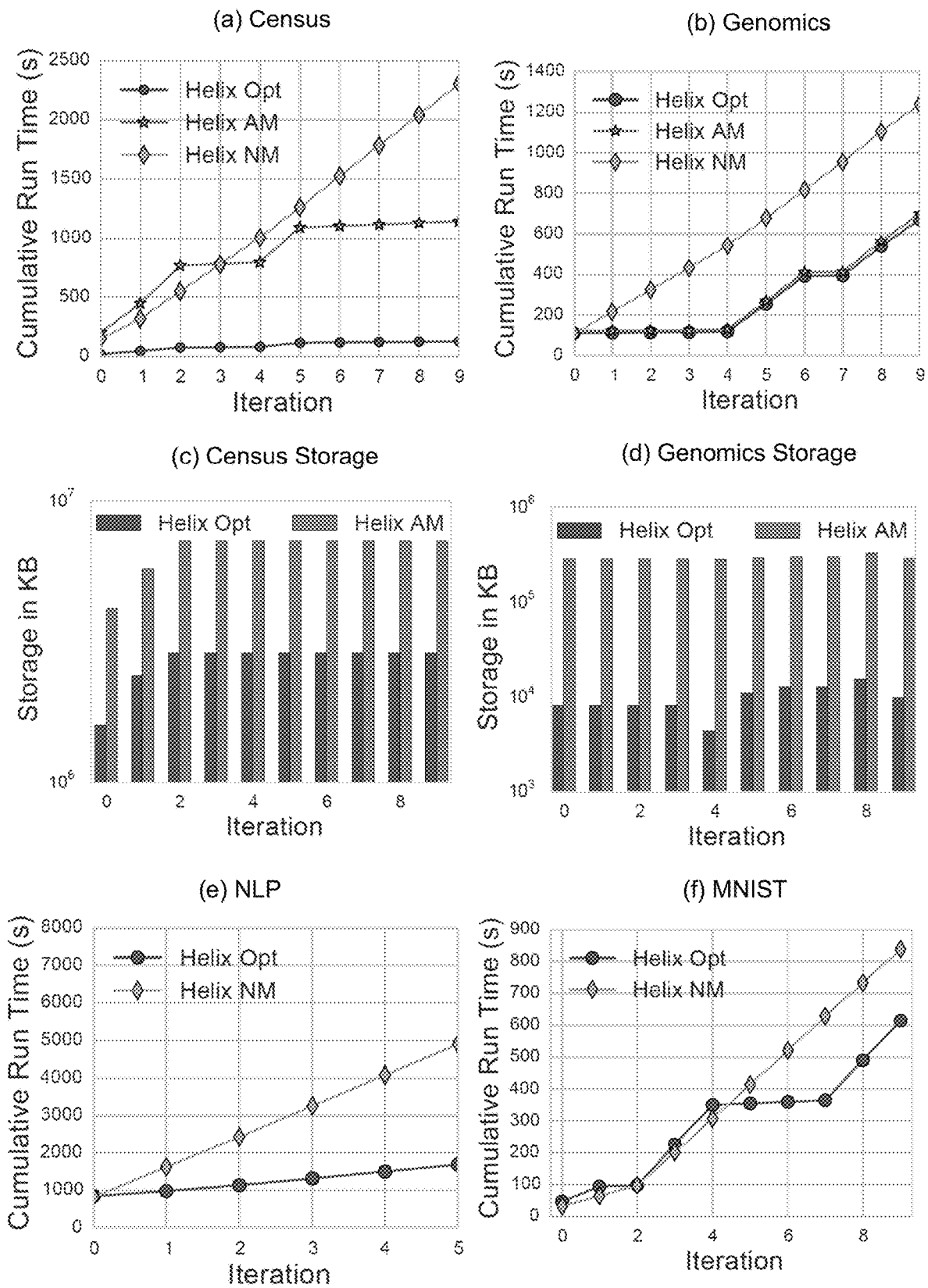
FIG. 10 illustrates results of assessment of the embodiments described herein.

FIGS. 10(a), (b), (e), and (f) show the cumulative run time on the same four workflows as in FIG. 6 for the three variants HELIX AM is absent from FIGS. 10(e) and (f) because it did not complete within 50× the time it took for other variants. The fact that HELIX AM failed to complete for the MNIST and NLP workflows demonstrate that indiscriminately materializing all intermediates can cripple performance. FIGS. 10(e) and (f) show that HELIX OPT achieves substantial run time reduction over HELIX NM using very little materialization time overhead (where the red line is above the yellow line).

For the census and genomics workflows where the materialization time is not prohibitive, FIGS. 10(a) and (b) show that in terms of cumulative run time, HELIX OPT outperforms HELIX AM, which attains the best reuse as explained above. We also compare the storage usage by HELIX AM and HELIX NM for these two workflows. FIGS. 10(c) and (d) show the storage size snapshot at the end of each iteration. The x-axis is the iteration numbers, and the y-axis is the amount of storage (in KB) in log scale. The storage use for HELIX NM is omitted from these plots because it is always zero. We find that HELIX OPT outperforms HELIX AM while using less than half the storage used by HELIX AM for the census workflow in FIGS. 10(c) and ⅟₃₀ the storage of HELIX AM for the genomics workflow in FIG. 10(d). Storage is not monotonic because HELIX purges any previous materialization of original operators prior to execution, and these operators may not be chosen for materialization after execution, thus resulting in a decrease in storage.

Furthermore, to study the optimality of Algorithm 2, we compare the distribution of nodes in the prune, reload, and compute states $S_p$; $S_i$; $S_c$ between HELIX OPT and HELIX AM for workflows with HELIX AM completed in reasonable times. Since everything is materialized in HELIX AM, it achieves maximum reuse in the next iteration. FIG. 9 shows that HELIX OPT enables the exact same reuse as HELIX AM, demonstrating its effectiveness on real workflows.

Overall, neither HELIX AM nor HELIX NM is the dominant strategy in all scenarios, and both can be suboptimal in some cases.

6.7 Memory Usage by HELIX

Figure 11:
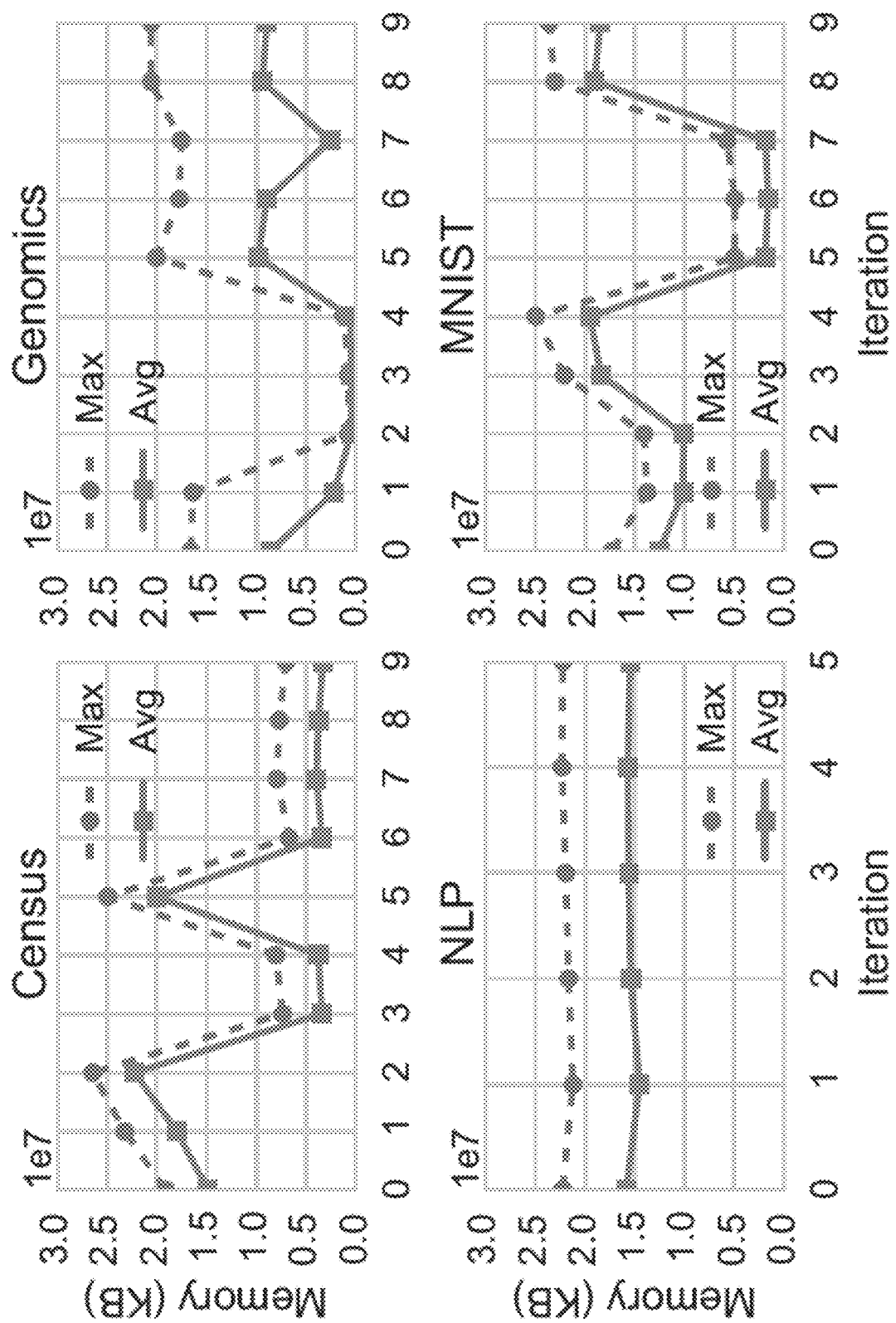
FIG. 11 illustrates results of assessment of the embodiments described herein.

Memory usage by HELIX was evaluated to ensure that its materialization and reuse benefits do not come at the expense of large memory overhead. Memory usage was measured at one-second intervals during HELIX workflow execution. FIG. 11 shows the peak and average memory used by HELIX in each iteration for all four workflows. 30 GB memory (25% of total available memory) was allocated in the experiments HELIX runs within the memory constraints on all workflows. Furthermore, on iterations where HELIX reuses intermediate results to achieve a high reduction in run time compared to other systems, memory usage is also significantly reduced. This indicates that HELIX reuses small intermediates that enable the pruning of a large portion of the subgraph to reduce run time, instead of overloading memory.

7. Conclusions

Presented in these experimental results is HELIX, a declarative system aimed at accelerating iterative ML application development. In addition to its user friendly, flexible, and succinct programming interface, HELIX tackles two major optimization problems, namely OPT-EXEC-PLAN and OPT-MAT-PLAN, that together enable cross-iteration optimizations resulting in significant run time reduction for future iterations. A PTIME algorithm was devised to solve OPT-EXEC-PLAN by using a reduction to MAX-FLOW. OPT-MAT-PLAN is NP-HARD and a light-weight, effective heuristic for this purpose was developed. HELIX was evaluated against DeepDive and KeystoneML on workflows from social sciences, NLP, computer vision, and natural sciences that vary greatly in characteristics to test the versatility of the embodiments described herein HELIX was found to support a variety of diverse machine learning applications with ease and provides 40-60% cumulative run time reduction on complex learning tasks and nearly an order of magnitude reduction on simpler ML tasks compared to both DeepDive and KeystoneML. While HELIX is implemented in a specific way, the techniques and abstractions presented in this work are general-purpose; other systems can enjoy the benefits of HELIX's optimization modules through simple wrappers and connectors.

Iterative workflow development can be further accelerated via introspection and querying across workflow versions over time, automating trimming of redundant workflow nodes, as well as auto-suggestion of workflow components to aid workflow development by novices. Specifically, HELIX is capable of tracing specific features in the ML model to the operators in the DAG. This allows information about feature importance learned in the ML model to be used directly to prune the DAG. In addition, the materialization and reuse techniques proposed herein can be extended to optimize parallel executions of similar workflows.

IV. CONCLUSION

The invention is not intended to be limited to the disclosed embodiments of the invention. It should be understood that the foregoing disclosure emphasizes certain specific embodiments of the invention and that all modifications or alternatives equivalent thereto are within the spirit and scope of the invention as set forth in the appended claims The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An article of manufacture including a non-transitory computer-readable medium, having stored thereon program instructions that, upon execution by a computing device, cause the computing device to perform operations comprising:
obtaining a representation of a machine learning workflow, wherein the machine learning workflow includes a plurality of data processing tasks, and wherein directed data dependencies exist between pairs of the data processing tasks and between portions of target data and instances of the data processing tasks;
executing the machine learning workflow, wherein executing the machine learning workflow comprises, for a particular data processing task of the plurality of data processing tasks, determining a cost function for the particular data processing task; determining that the cost function exceeds a threshold value; and, responsive to determining that the cost function exceeds the threshold value, storing an output of the particular data processing task to a data storage;
receiving an indication of a modification to the machine learning workflow;
based on the machine learning workflow and the indication, generating a modified machine learning workflow; and
executing the modified machine learning workflow, wherein executing the modified machine learning workflow comprises: (i) loading the output of the particular data processing task, and (ii) using the output to determine an output of a different data processing task of the plurality of data processing tasks.

2. The article of manufacture of claim 1, wherein executing the machine learning workflow further comprises generating a first performance metric for the machine learning workflow, wherein executing the modified machine learning workflow further comprises generating a second performance metric for the modified machine learning workflow, and wherein the operations further comprise:
providing an indication of the first performance metric and the second performance metric.

3. The article of manufacture of claim 1, wherein at least one data processing task of the plurality of data processing tasks includes data preprocessing.

4. The article of manufacture of claim 1, wherein at least one data processing task of the plurality of data processing tasks includes training a machine learning model.

5. The article of manufacture of claim 1, wherein receiving the indication of the modification to the machine learning workflow comprises receiving an indication of at least one change to one or more data processing tasks of the plurality of data processing tasks, and wherein executing the modified machine learning workflow further comprises:
determining, for the plurality of data processing tasks, whether to re-compute outputs of the data processing tasks, to load previously stored outputs of the data processing tasks, or to do neither.

6. The article of manufacture of claim 5, wherein a directed data dependency exists between a first data processing task and a second data processing task, wherein determining, for the plurality of data processing tasks, whether to re-compute the outputs of the data processing tasks, to load previously stored outputs of the data processing tasks, or to do neither comprises:
determining to load a previously stored output of the first data processing task; and
determining to re-compute the output of a second data processing task based on the previously stored output of the first data processing task.

7. The article of manufacture of claim 6, wherein determining to re-compute the output of the second data processing task comprises determining that the indication of the modification to the machine learning workflow includes an indication of a modification to the second data processing task.

8. The article of manufacture of claim 6, wherein determining to load the previously stored output of the first data processing task comprises determining that the machine learning workflow includes the directed data dependency between the first data processing task and the second data processing task.

9. The article of manufacture of claim 6, wherein determining to re-compute the output of a second data processing task comprises:
determining that the machine learning workflow includes a further directed data dependency between the second data processing task and a further data processing task for which an output will be re-computed; and
determining that a further previously stored output is not available for the second data processing task.

10. The article of manufacture of claim 1, wherein determining the cost function for the particular data processing task comprises:
determining, based on the directed data dependencies between the data processing tasks and portions of the target data, a set of the data processing tasks on which the particular data processing task has a direct or indirect data dependency; and determining a sum of a computation cost for the particular data processing task and of computation costs for each of the data processing tasks in the set of the data processing tasks.

11. The article of manufacture of claim 10, further comprising determining the computation cost for the particular data processing task based on an observed cost to compute the particular data processing task prior to executing the machine learning workflow.

12. The article of manufacture of claim 1, the operations further comprising:
obtaining a predicted further modification to the machine learning workflow;
based on the machine learning workflow and the predicted further modification, generating a further modified machine learning workflow;
executing the further modified machine learning workflow, wherein executing the further modified machine learning workflow comprises generating a performance metric for the further modified machine learning workflow;
receiving an actual further modification to the machine learning workflow;
determining that the actual further modification is equivalent to the predicted further modification; and
responsive to determining that the actual further modification is equivalent to the predicted further modification, providing an indication of the performance metric for the further modified machine learning workflow.

13. A method comprising:
obtaining a representation of a machine learning workflow, wherein the machine learning workflow includes a plurality of data processing tasks, and wherein directed data dependencies exist between pairs of the data processing tasks and between portions of target data and instances of the data processing tasks;
executing the machine learning workflow, wherein executing the machine learning workflow comprises, for a particular data processing task of the plurality of data processing tasks, determining a cost function for the particular data processing task; determining that the cost function exceeds a threshold value; and, responsive to determining that the cost function exceeds the threshold value, storing an output of the particular data processing task to a data storage;
receiving an indication of a modification to the machine learning workflow;
based on the machine learning workflow and the indication, generating a modified machine learning workflow; and
executing the modified machine learning workflow, wherein executing the modified machine learning workflow comprises: (i) loading the output of the particular data processing task, and (ii) using the output to determine an output of a different data processing task of the plurality of data processing tasks.

14. The method of claim 13, wherein receiving the indication of the modification to the machine learning workflow comprises receiving an indication of at least one change to one or more data processing tasks of the plurality of data processing tasks, and wherein executing the modified machine learning workflow further comprises:
determining, for the plurality of data processing tasks, whether to re-compute outputs of the data processing tasks, to load previously stored outputs of the data processing tasks, or to do neither.

15. The method of claim 14, wherein a directed data dependency exists between a first data processing task and a second data processing task, wherein determining, for the plurality of data processing tasks, whether to re-compute the outputs of the data processing tasks, to load previously stored outputs of the data processing tasks, or to do neither comprises:
determining to load a previously stored output of the first data processing task; and
determining to re-compute the output of a second data processing task based on the previously stored output of the first data processing task.

16. The method of claim 15, wherein determining to load the previously stored output of the first data processing task comprises determining that the machine learning workflow includes the directed data dependency between the first data processing task and the second data processing task.

17. The method of claim 13, wherein determining the cost function for the particular data processing task comprises:
determining, based on the directed data dependencies between the data processing tasks and portions of the target data, a set of the data processing tasks that have a direct or indirect data dependency on the particular data processing task; and
determining a sum of a computation cost for the particular data processing task and of computation costs for each of the data processing tasks in the set of the data processing tasks.

18. A method comprising:
obtaining a representation of a data processing workflow, wherein the data processing workflow includes a plurality of data processing tasks, and wherein directed data dependencies exist between pairs of the data processing tasks and between portions of target data and instances of the data processing tasks;
executing the data processing workflow, wherein executing the data processing workflow comprises, for a particular data processing task of the plurality of data processing tasks, determining a cost function for the particular data processing task; determining that the cost function exceeds a threshold value; and, responsive to determining that the cost function exceeds the threshold value, storing an output of the particular data processing task to a data storage;
receiving an indication of a modification to the data processing workflow;
based on the data processing workflow and the indication, generating a modified data processing workflow; and
executing the modified data processing workflow, wherein executing the modified data processing workflow comprises: (i) loading the output of the particular data processing task, and (ii) using the output to determine an output of a different data processing task of the plurality of data processing tasks.

19. The method of claim 18, wherein determining the cost function for the particular data processing task comprises:
determining, based on the directed data dependencies between the data processing tasks and portions of the target data, a set of the data processing tasks on which the particular data processing task has a direct or indirect data dependency; and
determining a sum of a computation cost for the particular data processing task and of computation costs for each of the data processing tasks in the set of the data processing tasks.

20. The method of claim 19, further comprising determining the computation cost for the particular data processing task based on an observed cost to compute the particular data processing task prior to executing the data processing workflow.

* * * * *